US012805986B2

(12) United States Patent
Kjær et al.

(10) Patent No.: US 12,805,986 B2
(45) Date of Patent: Nov. 24, 2026

(54) INTRAORAL 3D SCANNING DEVICE FOR PROJECTING A HIGH-DENSITY LIGHT PATTERN

(71) Applicant: 3SHAPE A/S, Copenhagen K (DK)

(72) Inventors: Rasmus Kjær, Copenhagen K (DK); Henrik Öjelund, Copenhagen K (DK); Karsten Bjerrum Dideriksen, Copenhagen K (DK); Isak Mottelson, Copenhagen K (DK)

(73) Assignee: 3SHAPE A/S, Kobenhavn K (DK)

( * ) Notice: Subject to any disclaimer, the term of this patent is extended or adjusted under 35 U.S.C. 154(b) by 0 days.

(21) Appl. No.: 19/247,189

(22) Filed: Jun. 24, 2025

(65) Prior Publication Data

US 2025/0318915 A1 Oct. 16, 2025

Related U.S. Application Data

(63) Continuation of application No. 18/851,465, filed as application No. PCT/EP2023/058521 on Mar. 31, 2023.

(30) Foreign Application Priority Data

Mar. 31, 2022 (EP) .................................... 22165957
Jul. 8, 2022 (EP) .................................... 22183907

(51) Int. Cl.
*H04N 13/246* (2018.01)
*A61C 9/00* (2006.01)
*H04N 13/254* (2018.01)

(52) U.S. Cl.
CPC .......... *A61C 9/006* (2013.01); *H04N 13/246* (2018.05); *H04N 13/254* (2018.05)

(58) Field of Classification Search
CPC .... A61C 9/006; H04N 13/246; H04N 13/254; G01B 11/2513; G01B 11/2518
(Continued)

(56) References Cited

U.S. PATENT DOCUMENTS 12,279,929 B2 * 4/2025 Saphier .................. A61C 9/006
12,611,289 B2 * 4/2026 Bonding ............. A61C 9/0053
(Continued)

FOREIGN PATENT DOCUMENTS

EP 4425429 A1 9/2024
WO 2023117981 A1 6/2023

OTHER PUBLICATIONS

International Search Report (PCT/ISA/210) and Written Opinion (PCT/ISA/237) mailed on Jun. 15, 2023 by the European Patent Office as the International Searching Authority for International Application No. PCT/EP2023/058521. (15 pages).
(Continued)

*Primary Examiner* — Helen Shibru
(74) *Attorney, Agent, or Firm* — Buchanan Ingersoll & Rooney PC

(57) ABSTRACT

The present disclosure relates to systems and methods for generating a digital representation of a three-dimensional (3D) object. In particular, the disclosure relates to a dental scanning system for acquiring images of the object and for generating the digital representation of the object. One embodiment relates to a dental scanning system for scanning a dental object, comprising an intraoral 3D scanning device comprising at least one projector unit configured to project a light pattern along a projector optical axis, the light pattern comprising a plurality of pattern features; one or more cameras having at least partly overlapping fields of view along different camera optical axes (and along the projector optical axis), each of the cameras comprising an image
(Continued)

sensor, wherein the system further comprises one or more processors configured to generate a digital three-dimensional representation of the dental object based on triangulation.

26 Claims, 19 Drawing Sheets

(58) Field of Classification Search
USPC ........................................................... 348/66
See application file for complete search history.

(56) References Cited

U.S. PATENT DOCUMENTS

2007/0124949 A1 6/2007 Burns et al.
2013/0125408 A1 5/2013 Atwell et al.
2015/0185054 A1* 7/2015 Hesch ........................ G06F 1/14
702/187
2019/0000412 A1 1/2019 Wong et al.
2020/0404243 A1 12/2020 Saphier et al.
2024/0293206 A1 9/2024 Öjelund et al.
2024/0398519 A1 12/2024 Mottelson et al.
2025/0221800 A1* 7/2025 Kjær .................... H04N 13/246
2025/0228648 A1 7/2025 Kjær et al.
2025/0239342 A1* 7/2025 Schneider .............. G16H 10/60

OTHER PUBLICATIONS

Yu, C., et al., "Lite-HRNet: A Lightweight High-Resolution Network", retrieved from arXiv:2104.06403v1 [cs.CV], Apr. 13, 2021. (11 pages).
Office Action issued on Jan. 15, 2026, by the U.S. Patent and Trademark Office in co-pending U.S. Appl. No. 18/851,465. (18 pages).

* cited by examiner

INTRAORAL 3D SCANNING DEVICE FOR PROJECTING A HIGH-DENSITY LIGHT PATTERN

CROSS REFERENCE TO RELATED APPLICATIONS

The present application is a continuation of U.S. patent application Ser. No. 18/851,465, which was filed on Sep. 26, 2024, which is a national stage application of PCT/EP2023/058521, which was filed on Mar. 31, 2023, which claims priority of European Patent Application No. 22183907.9, which was filed on Jul. 8, 2022, and European Patent Application No. 22165957.6, which was filed on Mar. 31, 2022, the contents of all of which are incorporated herein by reference in their entirety.

The present disclosure relates to systems and methods for generating a digital representation of a three-dimensional (3D) object. In particular, the disclosure relates to dental scanning system for scanning a 3D object by means of a light pattern in order to acquire images of the object and generate a digital representation of the object. The disclosure further relates to a dental scanning system for acquiring images of the object and for generating the digital representation of the object.

BACKGROUND

Digital dentistry is increasingly popular and offers several advantages over non-digital techniques. Digital dental scanning systems typically utilize a scanning device such as an intraoral 3D scanning device to generate a three-dimensional digital representation of an intraoral three-dimensional object/surface of a subject. A variety of different technologies exist within scanning devices, such as triangulation-based scanning, confocal scanning, focus scanning, ultrasound scanning, x-ray scanning, stereo vision, and optical coherent tomography (OCT).

Optical scanning devices often feature a projector unit for projecting an illumination pattern onto the surface of a 3D object, and an image sensor for acquiring one or more images of the illuminated object. Within focus scanning devices, the projector unit and the camera are typically positioned along the same optical axis. However, for triangulation-based scanning devices, the projector unit and the camera are offset such that they form a triangle with a given point on the surface of the illuminated object. In general, computer stereo vision and optical triangulation-based 3D scanning devices use triangulation to determine the spatial dimensions and/or the geometry of an object. The density of the structured light pattern projected onto the object being scanned is important to the quality of the imaging. A higher density of the light pattern can provide for increased sampling of the surface, better resolution, and enable improved stitching of surfaces obtained from multiple images. However, a light pattern with a high density generally leads to a more complex image generation, in particular due to the so-called correspondence problem. In scanning systems employing triangulation, a central task is to solve the correspondence problem. Given two or more images of the same 3D object, taken from different points of view, the correspondence problem refers to the task of finding a set of points in one image which can be identified as the same points in another image. To do this, points or features in one image are matched with the corresponding points or corresponding features in another image. When the density of the projected light pattern increases the number of spots for which to solve the correspondence problem increases and become much more complex.

In order to generate the three-dimensional digital representation of the scanned object, such as a person's teeth, the correspondence problem generally need to be solved, at least when using a triangulation-based scanning device to acquire the images of the object. In general, it is desired that the 3D digital representation is generated in real-time, or at least in what is perceived as real-time to the user, e.g. the dentist. Therefore, the 3D representation is typically generated simultaneously with the acquisition of images/scan data, such that the user can immediately view the generated 3D representation while scanning a patient. The 3D representation may be generated in real-time. This is also considered important feedback to the user since it is very visible/clear when new scan data is added to the digital 3D representation.

The optical system of a 3D scanning device is typically internally modelled by a mathematical geometry model, which models all the optical components of the optical system. The geometry model typically includes information on the relative positions and orientations of the cameras and projectors in relation to each other. The arrangement of the optical components, e.g. the cameras and projectors, is typically assumed to be fixed in time. However, in reality the arrangement of said optical components may change a bit over time due to e.g. thermal expansion. It is of interest to develop a scanning device, which is able to mathematically account for changes in the physical configuration of the optical components in the scanning device.

SUMMARY

Thus, it is of interest to develop improved systems and methods for generating a digital 3D representation of a 3D object. In particular, it is desired to develop scanning systems that can take advantage of the presently disclosed improved solution of the correspondence problem. Furthermore, it is of interest to develop a scanning device, wherein a geometry model of the optical system of the scanning device may be updated dynamically, thereby enabling dynamic calibration.

The present inventors have solved the correspondence problem in a fast and reliable manner that enables a fast generation of the 3D representation by adding collections of image features for which the correspondence problem has been solved. Accordingly, instead of solving the correspondence problem feature by feature, the correspondence problem can be solved for collections of features, such that a consistent and reliable solution can be found for all features within the collection as also described in detail herein. Furthermore, the inventors have realized that by including a less dense pattern within the projected pattern, e.g. by having a plurality of fiducial markers within the pattern, then the correspondence problem may be solved initially for the less dense pattern. Subsequently, the solution to this problem may be used as an input for updating the mathematical geometry model of the scanning device, whereby the scanning device can be dynamically calibrated.

The present disclosure therefore relates to a 3D scanning system for scanning an object, e.g. a dental object, the system comprising:

- an intraoral 3D scanning device comprising:
  - at least one projector unit configured to project a light pattern of a predefined density on the dental object along a projector optical axis;

one or more cameras, such as at least two cameras, having at least partly overlapping fields of view along different camera optical axes (and along the projector optical axis), each of said camera optical axes defining an angle with the projector optical axis, each of the cameras comprising an image sensor having an array of pixels, and one or more processors, wherein at least one processor is configured to generate a digital three-dimensional representation of the dental object based on triangulation between the cameras and the light pattern.

It is preferred that each of said camera optical axes defines an angle with the projector optical axis of at least 3 degrees, such as approximately 5 to 15 degrees, preferably 5 to 10 degrees, even more preferably 8 to 10 degrees.

The preferred embodiment of the presently disclosed scanning system employs one or more projector units configured to project a static light pattern of a predefined density on the dental object along a projector optical axis. Advantages of using a static light pattern are that no moving parts are necessary in a projector for projecting a static light pattern. The associated electronics for generating the static light pattern can be kept quite simple. A static light pattern enables the use of one or more rolling shutter cameras. A static light pattern enables high contrast in the imaging system. And a projector for generating a static light pattern can be made very small and thereby for example be integrated in the tip of an intraoral scanning device thereby reducing the form factor of the tip and/or the intraoral scanning device. A further advantage of projecting a static pattern is that it allows the capture of all the image data simultaneously, thus preventing warping due to movement between the scanning device and the object.

In particular it has been found advantageous if the density, i.e. the density of features, of the projected light pattern is selected such that a density measure of the projected light pattern is above a predefined threshold, because a high-density pattern improves the resolution of the generated digital representation and captures an increased number of features of the scanned object. A high-density pattern may be understood as a pattern comprising more than 3000 pattern features. Typically, a dense light pattern leads to a more complex correspondence problem since there is a large number of features for which to solve the correspondence problem. Furthermore, a high-density pattern is more difficult to resolve due to the small features, which consequently sets a high requirement on the optics of the scanning device, as discussed below. The inventors have found that a pattern comprising more than 3000 pattern features provides a very good resolution of the corresponding 3D representation of the scanned object, since the high number of features provides for a high number of 3D points.

It is challenging to project a high-density pattern with a large depth of focus (i.e. in a large focus range) for a short working distance of the optical system, e.g. of the projector unit. In general, the projected features will not be imaged by the scanning device as ideal points, but rather they will have a certain spread (blurring) when imaged by scanning device. The degree of spreading of the feature can be described by a point spread function (PSF). The resolution of the 3D representation is limited by the spreading of the features described by the PSF, since the features need to be sharp in the images in order to accurately determine the 3D points for generating the 3D representation. In some cases, the features are described by a PSF having an Airy disk radius of equal to or less than 100 μm, such as equal to or less than 50 μm. The minimum feature size in the pattern is limited by the imaging resolving power of the optics of the scanning device. The imaging resolution is limited primarily by three effects: defocus, lens aberrations, and diffraction. A small aperture is advantageous for minimizing the negative effects of defocus and lens aberrations, since a camera or projector having a small aperture is highly tolerant of defocus. However, a small aperture causes more diffraction, which negatively affects the imaging resolution. Thus, it is difficult to optimize the imaging resolution by changing the size of the aperture, since the three effects are affected differently by the size of the aperture.

Through experiments performed by the inventors, it has been determined that an optical system, e.g. comprising the projector unit and/or the camera(s) as disclosed herein, having a numerical aperture of between 0.0035 and 0.015 enables the ability to resolve very fine details of between 50-200 μm in size in a focus range between 10 mm and 50 mm, such as between 12 mm and 36 mm. In some applications, the optical system is configured to have a working distance of between 15 mm and 50 mm, e.g. the working distance of the projector unit and/or the camera(s). In some cases, the working distance can be longer than 50 mm, e.g. in case the scanning device comprises a mirror arranged in the distal end of the scanning device. Conversely, the working distance may in some cases be shorter than 15 mm if the scan unit is provided without a mirror in the scanning device. A numerical aperture of between 0.0035 and 0.015 may correspond to apertures providing a pupil diameter of between 0.2 mm and 0.7 mm. Accordingly, the technical effect of the choice of numerical aperture is that it provides the ability to project a high-density pattern, wherein the pattern is in focus in a relatively wide focus range in close proximity to the scanning device, and wherein the blurring of the pattern features is below a given tolerance, e.g. given by the Airy disk mentioned previously.

Consequently, a more accurate 3D representation may be generated since the position of the 3D points can be determined more accurately, i.e. with less uncertainty, and also since the smaller features allows for more features to be present in the pattern, thereby leading to a 3D representation comprising more 3D points.

In a preferred embodiment the light pattern comprises a predefined number of similar pattern features and/or polygons, as known from a checkerboard pattern where black and white squares alternate. In the context of checkerboards herein, the terms squares and checkers are used interchangeably. A checkerboard pattern is an example of a pattern that can carry a particularly high number of pattern features, because each black square is surrounded by white squares and each white square is surrounded by black squares. The pattern may comprise between 1000 and 50000 pattern features, such as between 3000 and 25000 pattern features. In preferred embodiments of the presently disclosed scanning device, the total number of pattern features is at least 3000, preferably at least 10000, even more preferably at least 19000. This would for instance arise from using a checkerboard light pattern with 140×140 checkers corresponding to a total number of 19600 pattern features. Such a high-density light pattern has never been used within the dental field. As an example, a 140×140 checkerboard pattern projected on an area measuring about 20×20 $mm^2$ implies that each square in the checkerboard pattern is about or less than 0.15×0.15 mm. The high density of the features in such a pattern leads to unprecedented level of detail in the digital representation.

The present disclosure further relates to a computer program comprising instructions which, when the program is executed by one or more processors, causes the processor (s) to carry out any of the computer-implemented methods disclosed herein. The processor(s) may be part of the scanning device or the computer system. The present disclosure further relates to a computer-readable medium having stored thereon the computer program.

Preferably, the processor(s) are configured to perform the steps of the computer-implemented method(s) continuously, such that the digital representation is updated continuously during image acquisition in a scanning session. More preferably, the processor(s) are able to execute the steps of the method in real-time, or near real-time, such that the digital representation of the 3D object may be generated in real-time simultaneously with a user operating a scanning device for acquiring images of the object. Ideally, during execution of the method, the image sets (e.g. in case of four cameras, a set of four images) are processed so quickly that the processing is done by the time a new set of images is acquired, wherein the images are acquired at a predefined framerate, such as 25 frames per second (FPS) or higher. Such a scenario is an example of real-time processing.

In one embodiment, the intraoral 3D scanning system comprises:

- at least one projector unit configured to project a light pattern on the dental object along a projector optical axis, the light pattern comprising a plurality of pattern features, wherein the pattern comprises a predefined number of fiducial markers;
- one or more cameras, such as at least two cameras, having at least partly overlapping fields of view along different camera optical axes and along the projector optical axis, each of said camera optical axes defining an angle of at least 3 degrees with the projector optical axis, each of the cameras comprising an image sensor for acquiring one or more images, and
- one or more processors, wherein at least one processor is configured to generate a digital three-dimensional representation of the dental object based on triangulation between the cameras and the light pattern.

The present disclosure further relates to a method for generating a digital three-dimensional representation of a dental object, the method comprising the steps of:

- projecting a pattern on a surface of the dental object using an intraoral scanning device;
- acquiring one or more sets of images, wherein each set of images comprises at least two images, wherein each image includes at least a portion of the projected pattern;
- determining one or more image features within each set of images;
- solving a correspondence problem within each set of images using a triangulation method, such that points in 3D space are determined based on the image features, wherein said points form a solution to the correspondence problem, wherein the correspondence problem is solved for groups of image features; and
- generating a digital three-dimensional representation of the dental object, wherein the solution to the correspondence problem is used to generate the three-dimensional representation.

The present disclosure further relates to a 3D scanning system comprising:

- an intraoral scanning device for scanning a dental object, the scanning device comprising:
  - one or more projector units configured to project a pattern on a surface of a dental object, wherein the pattern comprises a predefined number of fiducial markers;
  - two or more cameras for each projector unit, wherein the cameras are configured to acquire one or more sets of images, wherein each set of images comprises at least one image from each camera, wherein each image includes at least a portion of the projected pattern, said portion including at least one of said fiducial markers;
- one or more processors configured to:
  - identify one or more fiducial markers within at least one set of images among the acquired sets of images;
  - solve a correspondence problem related to the identified fiducial markers, wherein the correspondence problem is solved such that points in 3D space are determined based on the identified fiducial markers, wherein said points form a solution to the correspondence problem; and
  - calibrate the scanning device by adjusting one or more parameters of a mathematical geometry model associated with the scanning device, wherein the adjustment is based on the solution to the correspondence problem.

The present disclosure further relates to a method for calibrating an intraoral scanning device, the method comprising the steps of:

- projecting a pattern on a surface of a dental object using an intraoral scanning device, wherein the pattern comprises a predefined number of fiducial markers;
- acquiring one or more sets of images, wherein each set of images comprises at least two images, wherein each image includes at least a portion of the projected pattern, said portion including at least one of said fiducial markers;
- identifying one or more fiducial marker(s) within a first set of acquired images;
- solving a correspondence problem related to the fiducial markers, wherein the correspondence problem is solved such that points in 3D space are determined based on the identified fiducial markers, wherein said points form a solution to the correspondence problem; and
- calibrating the scanning device by adjusting one or more parameters of a mathematical geometry model associated with the scanning device, wherein the adjustment is based on the solution to the correspondence problem.

In some embodiments, the step of calibrating the scanning device comprises the steps of mathematically projecting one or more camera rays and projector rays together in 3D space, said rays associated with the fiducial markers; and minimizing the distance between the camera rays and a given associated projector ray by dynamically adjusting one or more parameters of the mathematical geometry model.

In this embodiment, the scan unit comprises a projector unit and four cameras.

Figure 4:
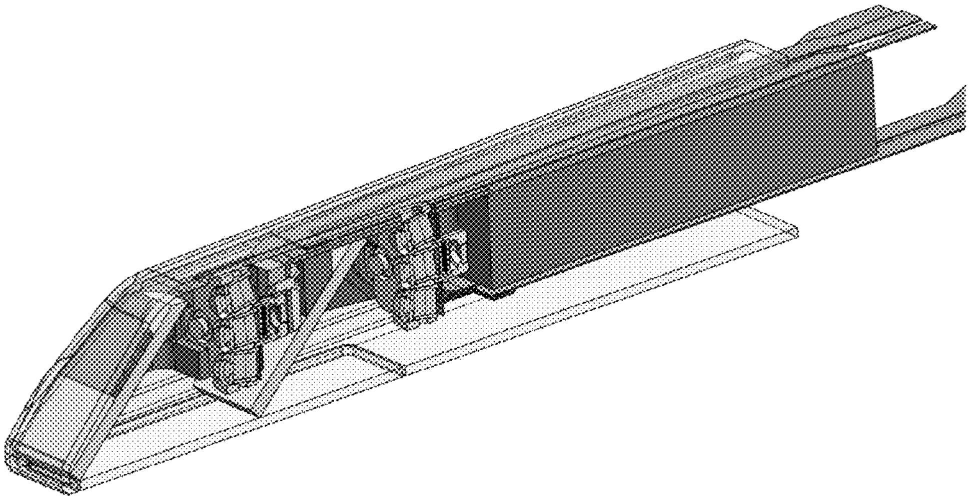

FIG. 4 shows a cross-section through a scanning device according to the present disclosure. In this embodiment, the scanning device comprises two scan units arranged in series.

Figure 5:
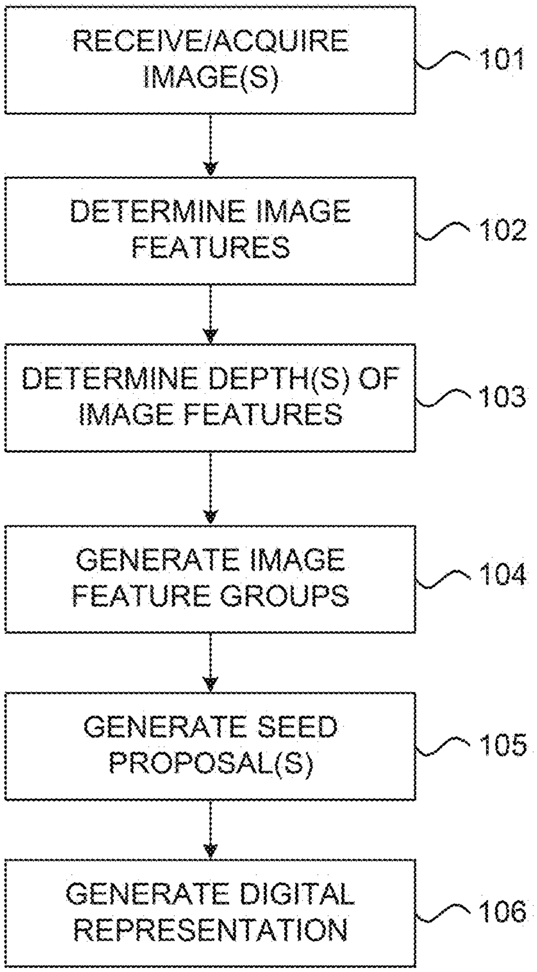

FIG. 5 shows a flowchart of the disclosed method according to an embodiment.

Figure 6:
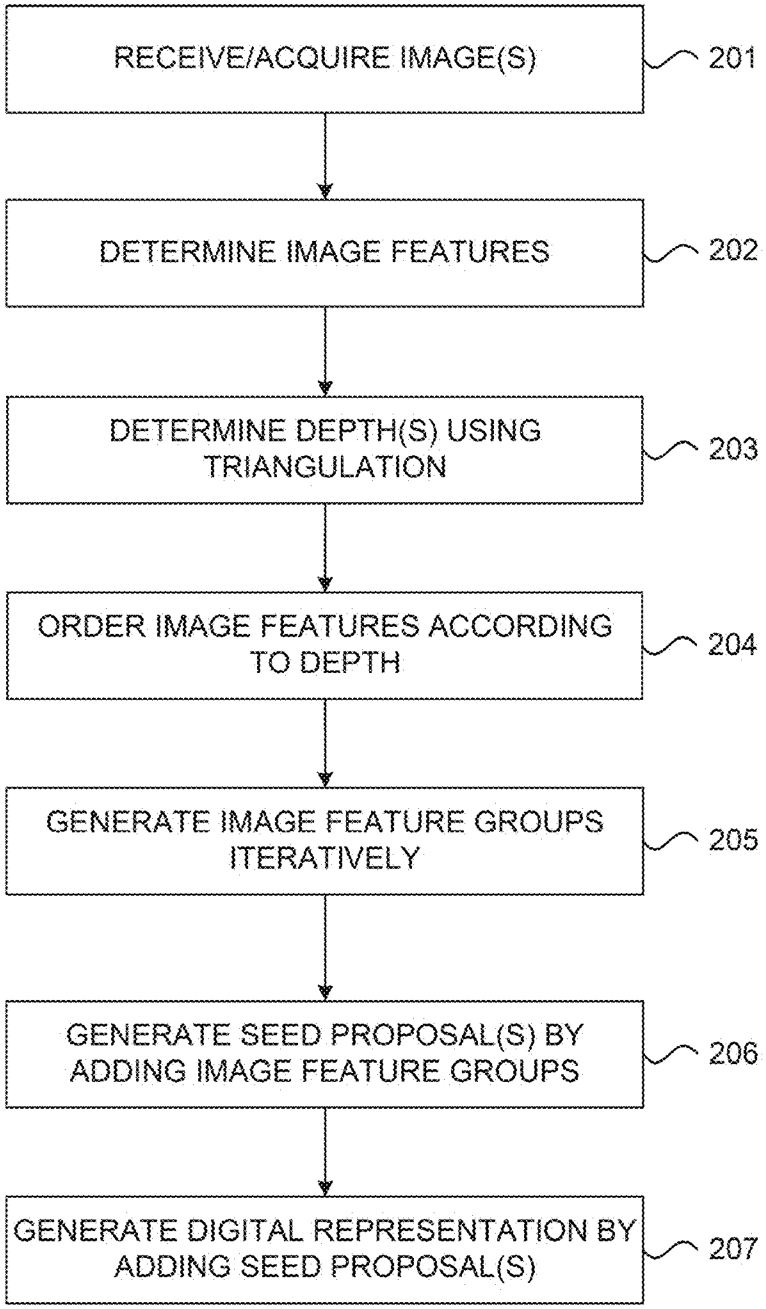

FIG. 6 shows a flowchart of the disclosed method according to an embodiment, wherein the method is more detailed than the one described in relation to FIG. 5.

Figure 7:
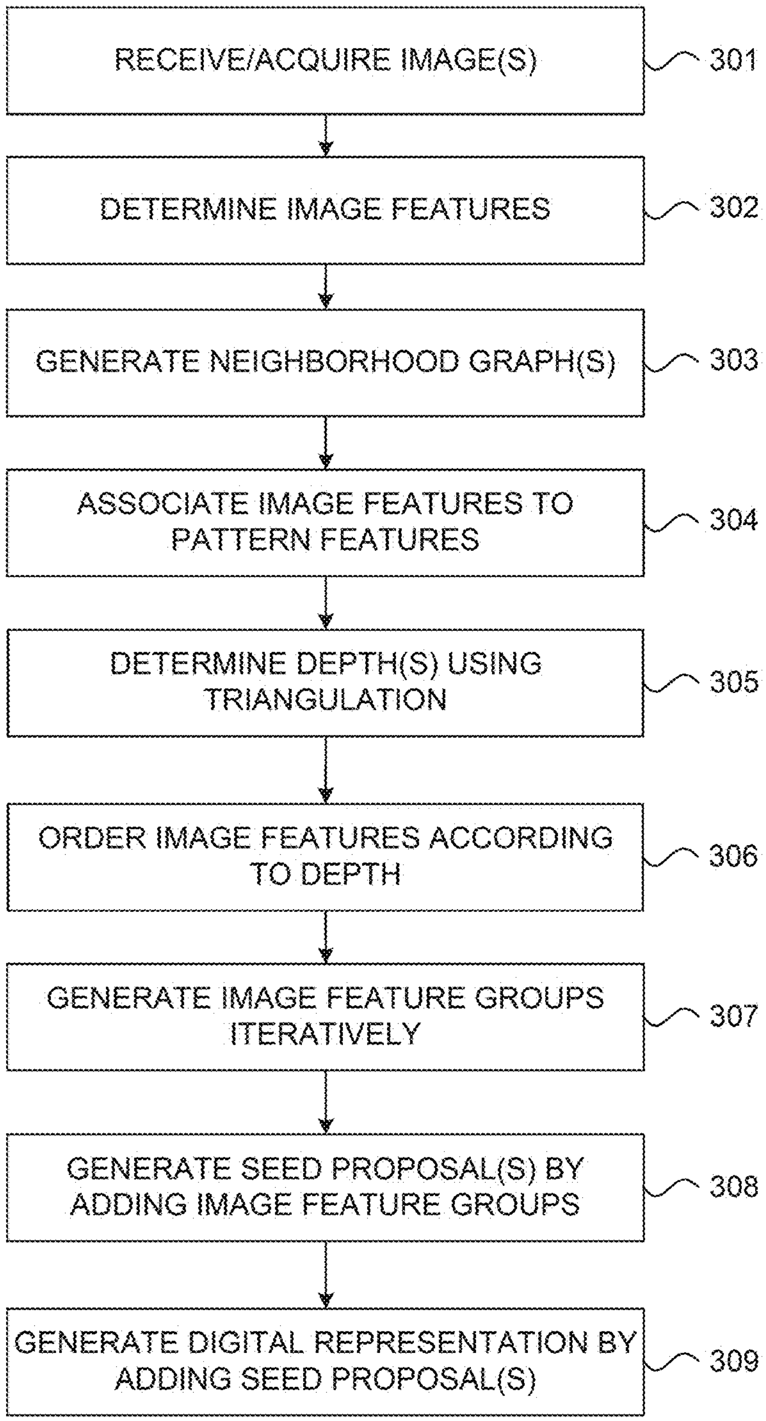

FIG. 7 shows a flowchart of the disclosed method according to an embodiment, wherein the method is even more detailed than the one described in relation to FIG. 5.

Figure 8:
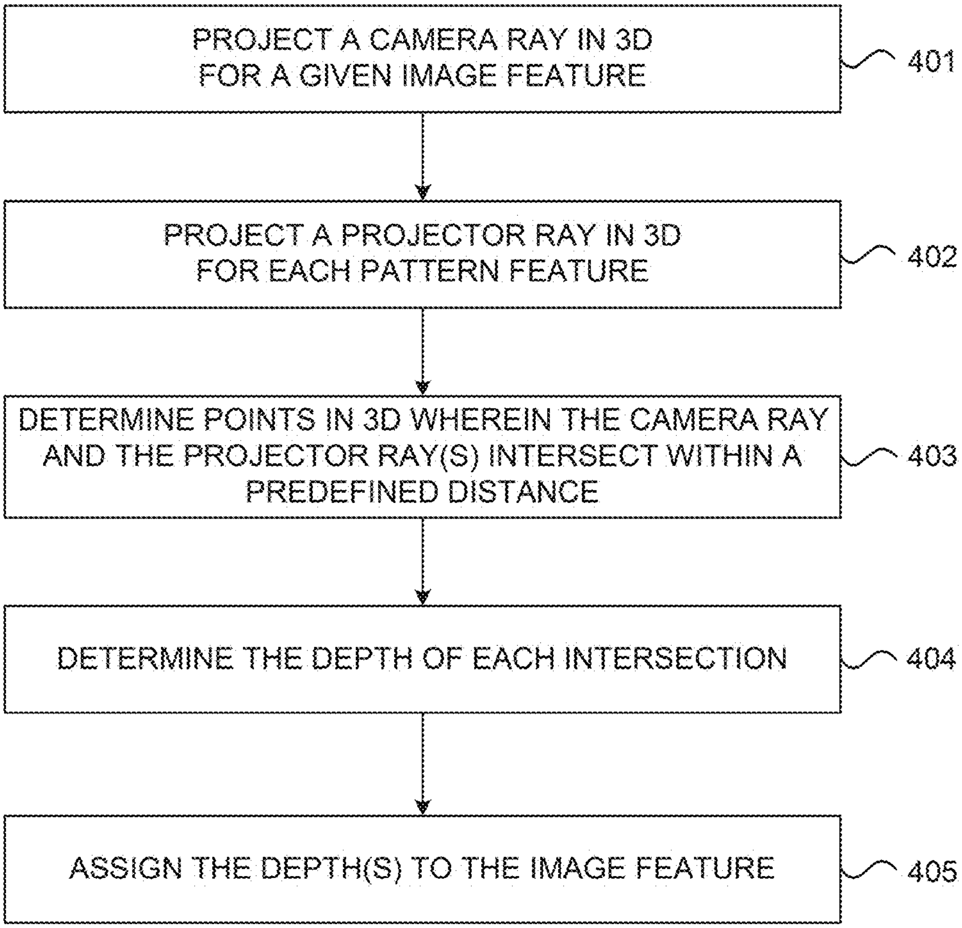

FIG. 8 shows a flowchart of an example of how to determine the depths of image features according to an embodiment of the presently disclosed method.

Figure 9:
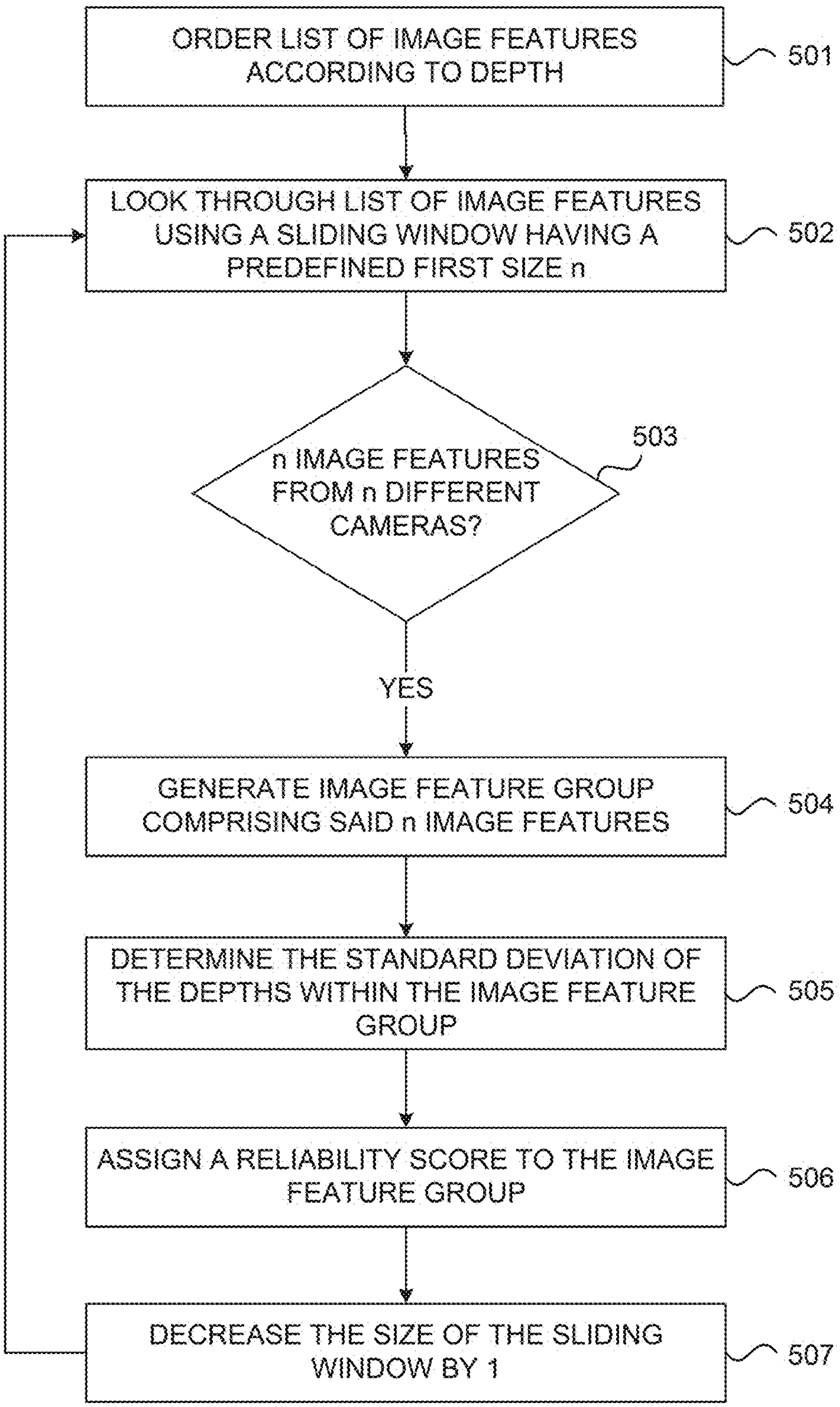

FIG. 9 shows a flowchart of an example of how to generate image feature groups according to an embodiment of the presently disclosed method.

Figure 10:
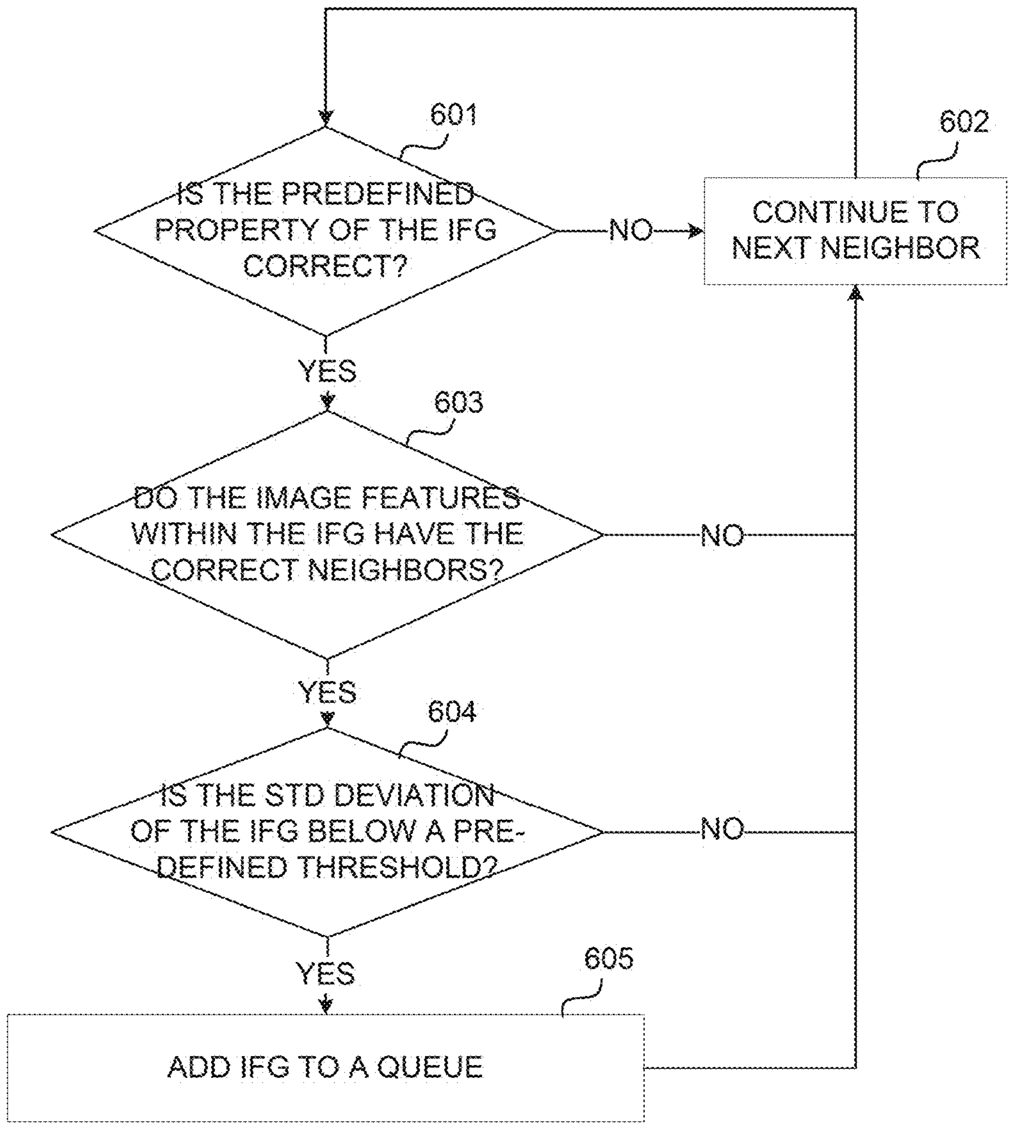

FIG. 10 shows a flowchart of an example of how to evaluate image feature groups according to predefined criteria and possibly add one or more to a queue.

Figure 11:
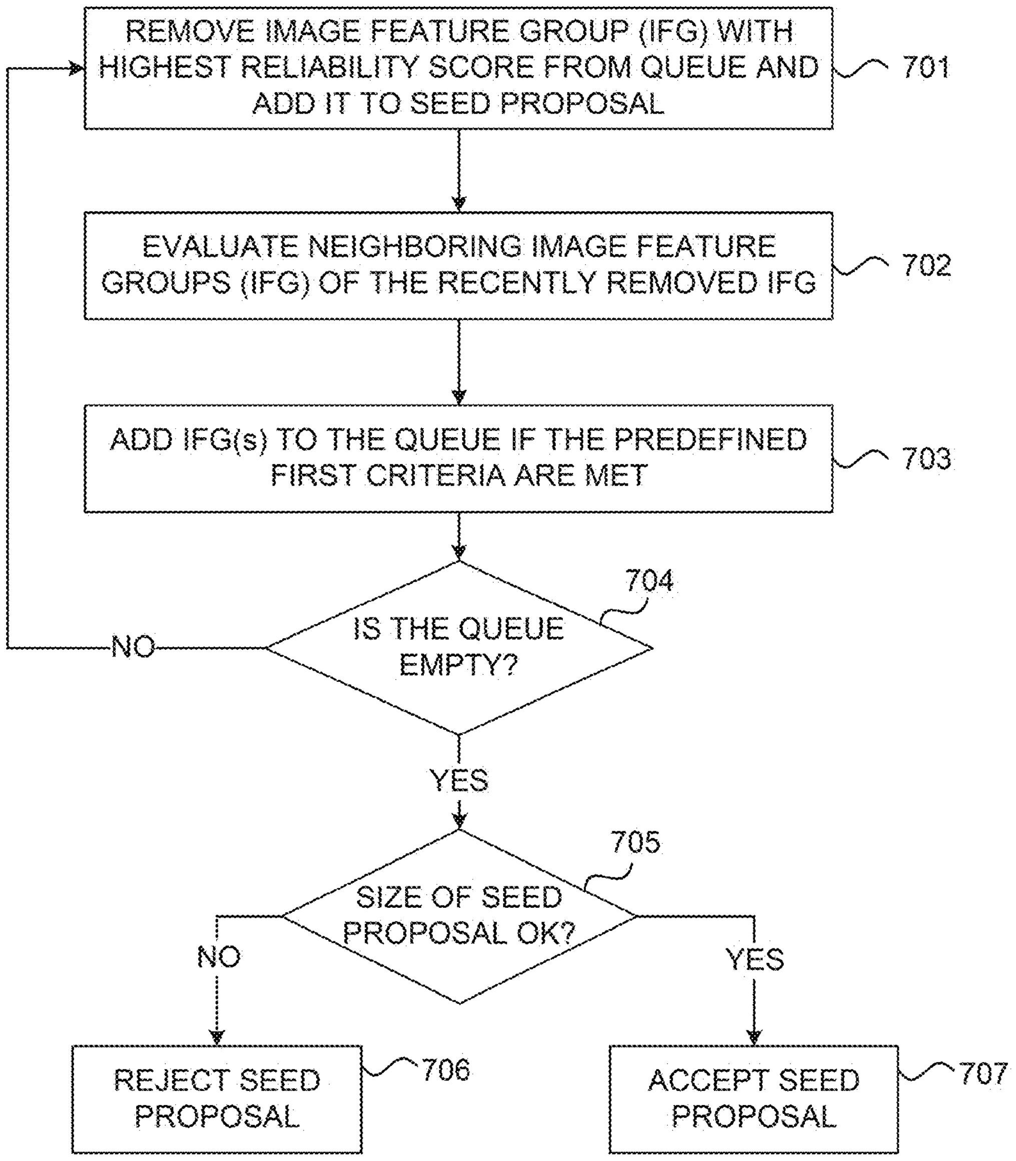

FIG. 11 shows a flowchart of another example of how to generate a seed proposal according to an embodiment of the presently disclosed method.

Figure 12:
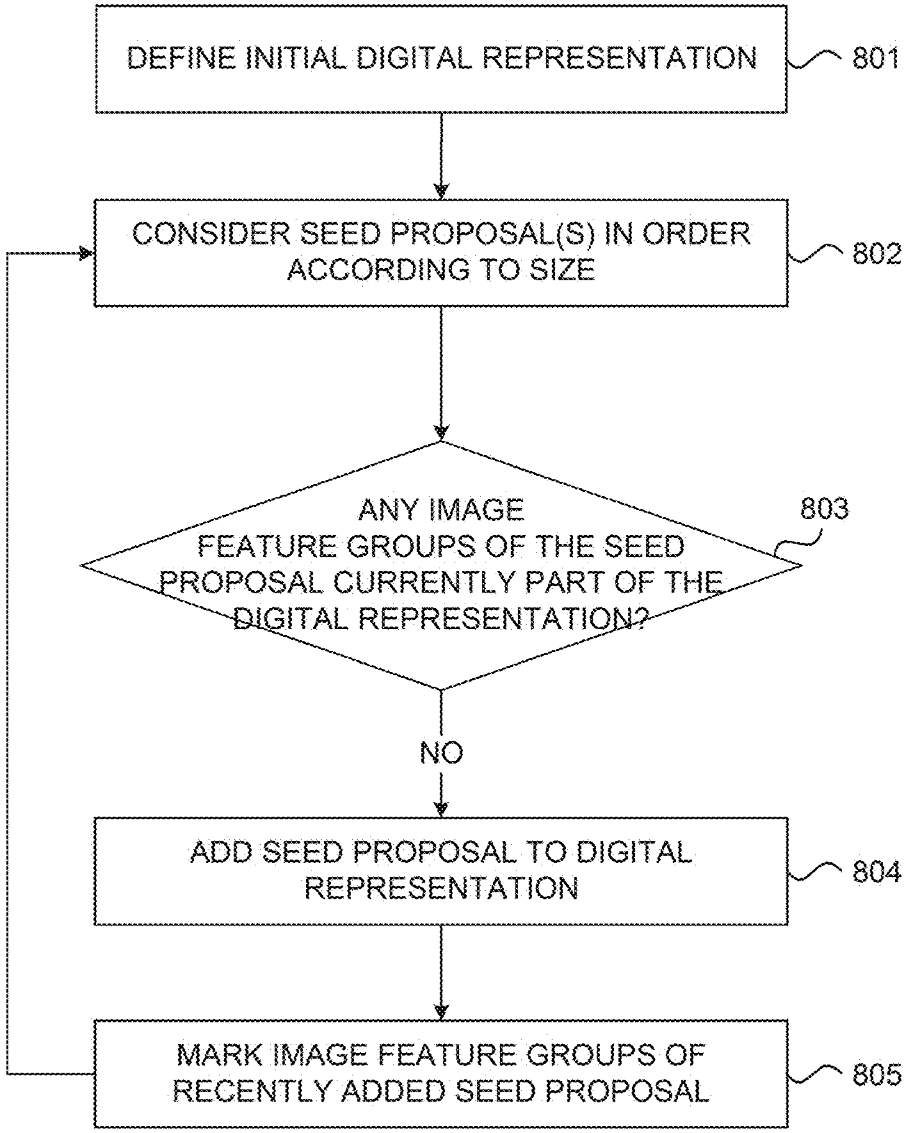

FIG. 12 shows a flowchart of an example of how to generate a digital representation according to an embodiment of the presently disclosed method.

Figure 13:
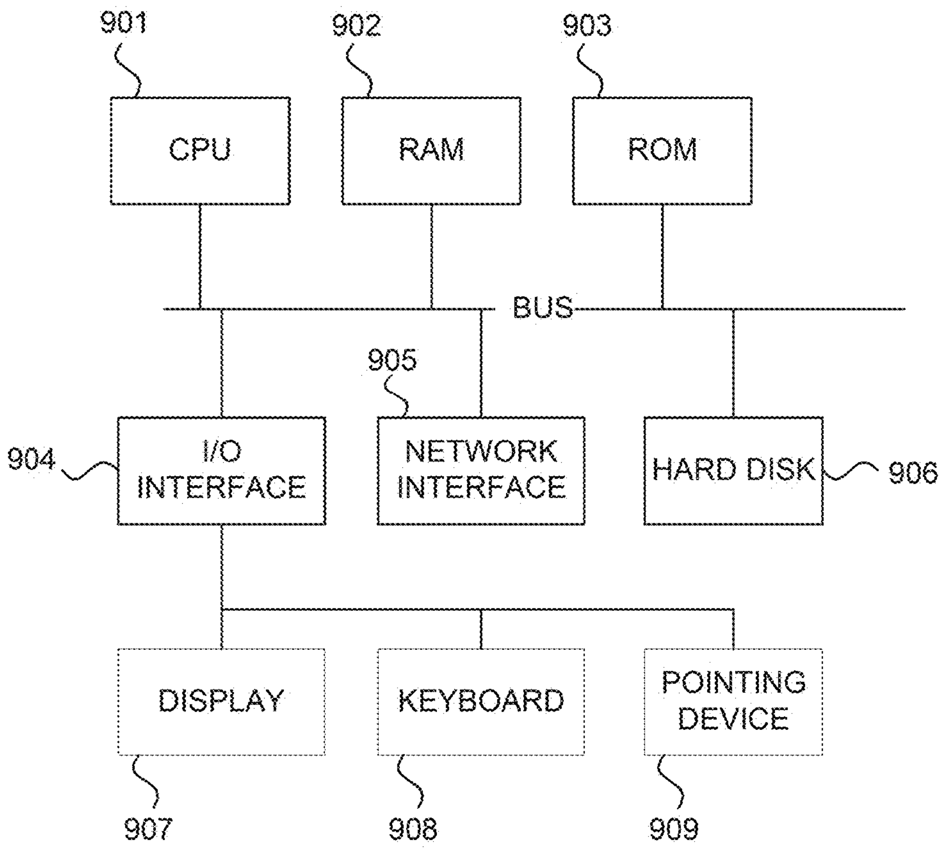

FIG. 13 shows a schematic of a computer system.

Figure 14:
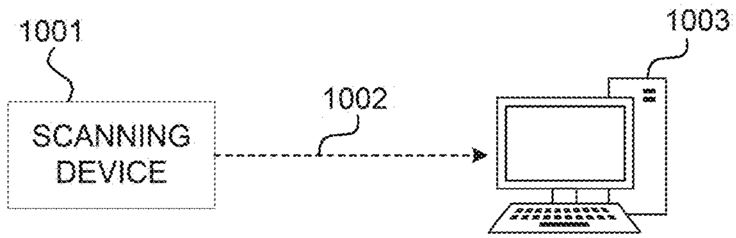

FIG. 14 shows an embodiment of a dental scanning system comprising a scanning device and a computer system.

Figure 15:
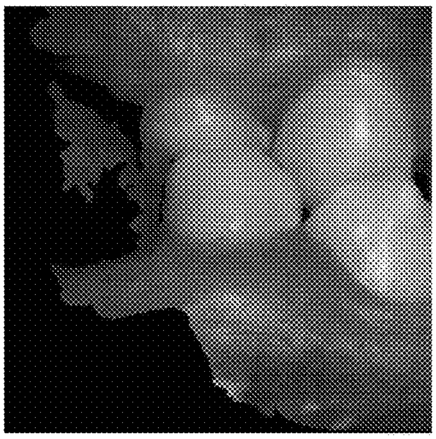

FIG. 15 shows an example of input data to the neural network described herein.

Figure 16:
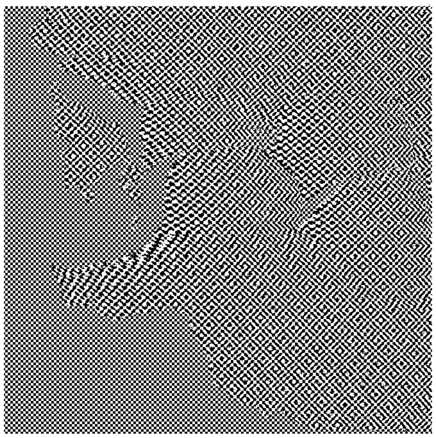

FIG. 16 shows an example of a first type of output from the neural network.

Figure 17:

FIG. 17 shows an example of a second type of output from the neural network.

Figure 18:

FIG. 18 shows an example of a third type of output from the neural network.

Figure 19:

FIG. 19 shows an example of a fourth type of output from the neural network.

Figure 20:
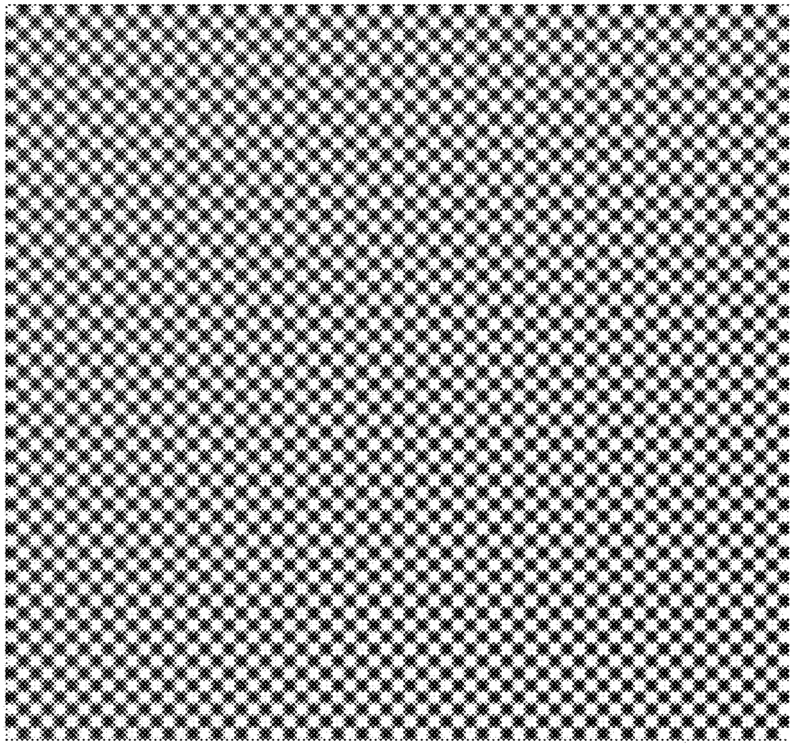

FIG. 20 shows an example of a checkerboard pattern.

Figure 21:
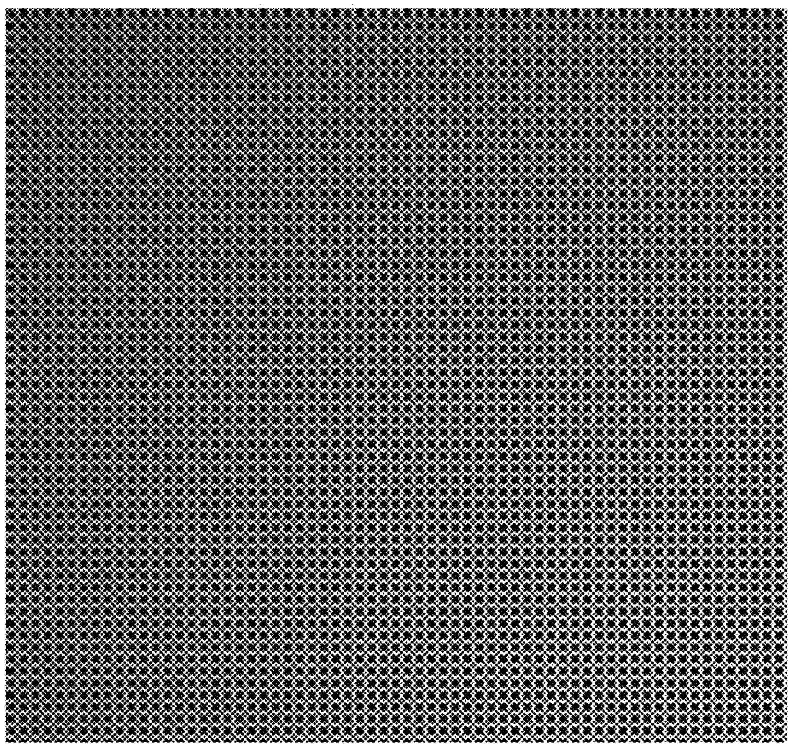

FIG. 21 shows a measured intensity signal of the checkerboard pattern shown in FIG. 20.

Figure 22:

FIG. 22 shows an example of a random pattern of black and white squares.

Figure 23:
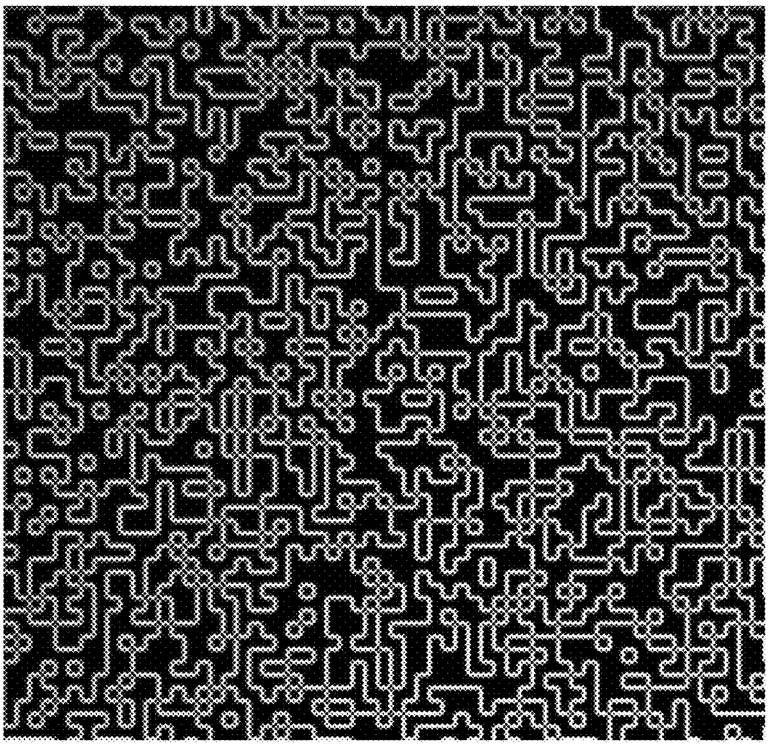

FIG. 23 shows a measured intensity signal of the random pattern shown in FIG. 22.

Figure 24:
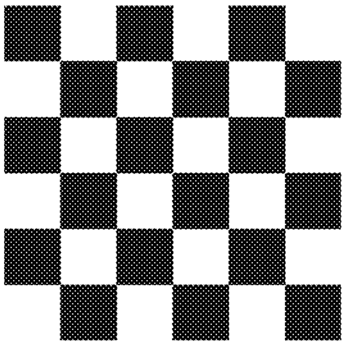

FIG. 24 shows an example of a polygonal pattern composed of checkers, thus forming a checkerboard pattern, each checker/square comprising four edges and four corners.

Figure 25:
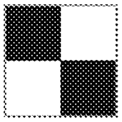

FIG. 25 shows an example of a repeating unit for the pattern shown in FIG. 24.

Figure 26:
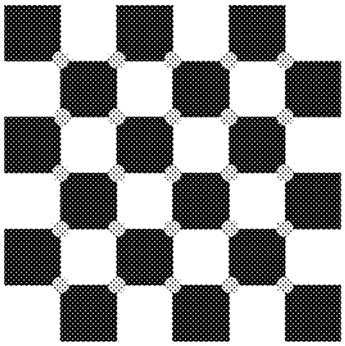

FIG. 26 shows an example of a checkerboard pattern, wherein pattern features are indicated as circles, said features corresponding to the inner corners in the pattern.

Figure 27:
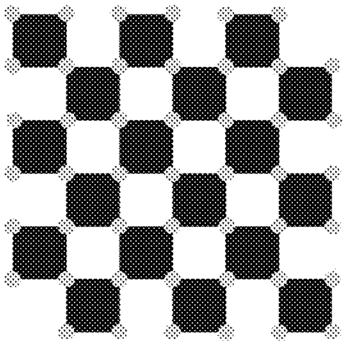

FIG. 27 shows an example of a checkerboard pattern, wherein pattern features are indicated as circles, said features corresponding to the corners in the pattern, wherein corners located on the outer boundary of the pattern are included.

Figure 28:
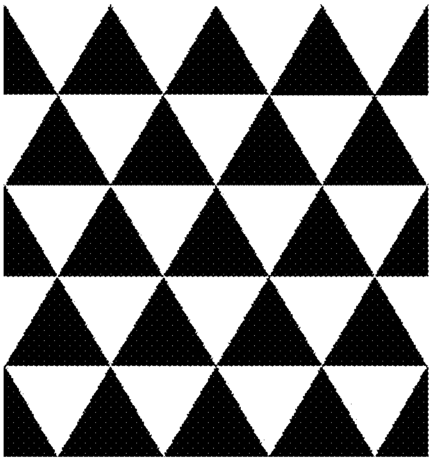

FIG. 28 shows an example of a polygonal pattern composed of triangles, each triangle comprising three edges and three corners.

Figure 29:
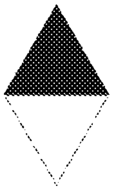

FIG. 29 shows an example of a repeating unit for the pattern shown in FIG. 28.

Figure 30:
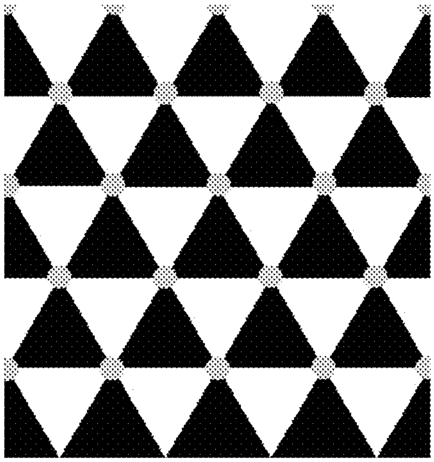

FIG. 30 shows an example of a polygonal pattern composed of triangles, wherein pattern features are indicated as circles, said features corresponding to the corners in the pattern.

Figure 31:
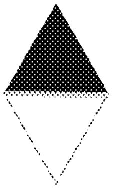

FIG. 31 shows an example of a repeating unit for the pattern shown in FIG. 30, wherein one of the edges have been highlighted.

Figure 32:
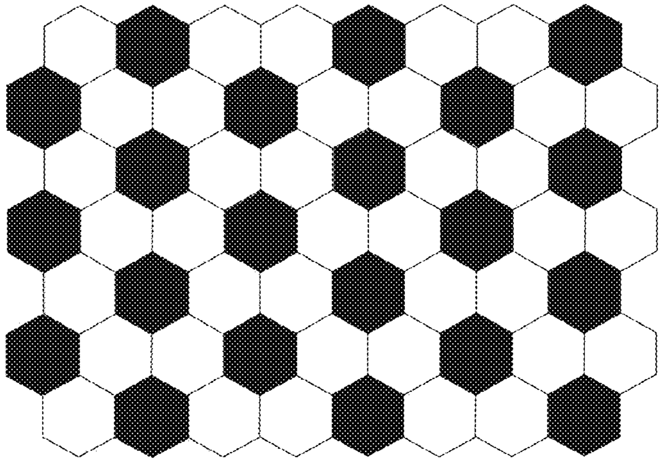

FIG. 32 shows an example of a polygonal pattern composed of hexagons, each hexagon comprising six edges and six corners.

Figure 33:
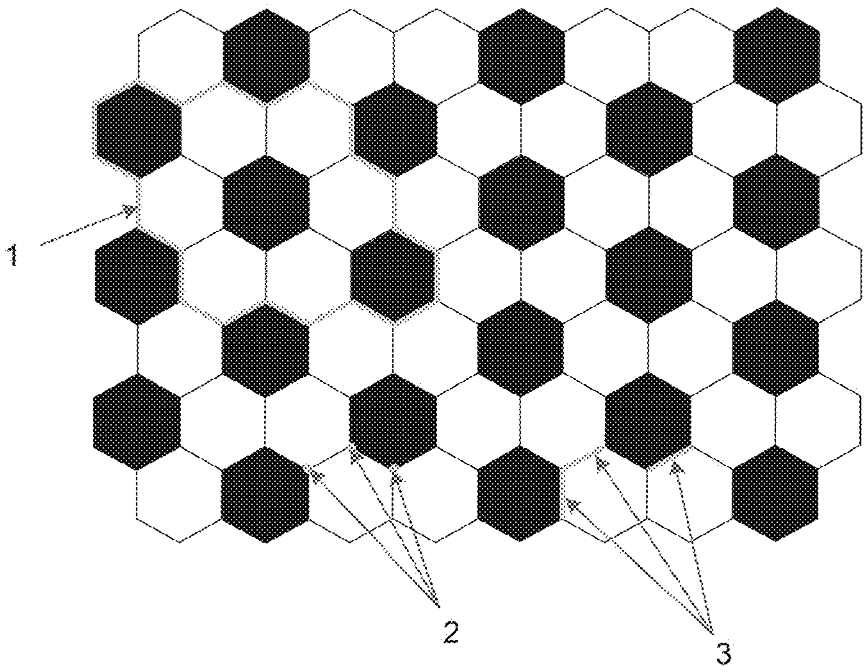

FIG. 33 shows the pattern of FIG. 32, wherein a repeating unit 1 has been indicated, along with some of the pattern features 2 and edges 3 of the pattern.

Figure 34:
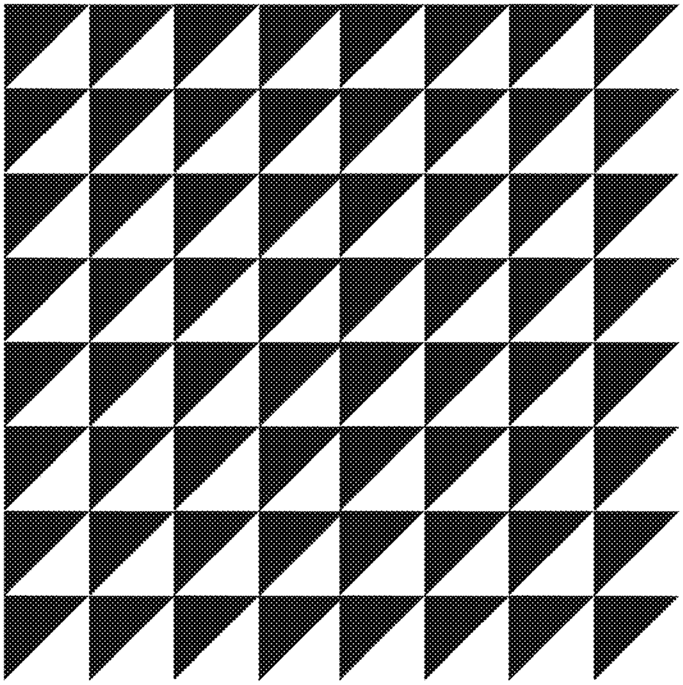

FIG. 34 shows an example of a polygonal pattern composed of triangles, each triangle comprising three edges and three corners.

Figure 35:
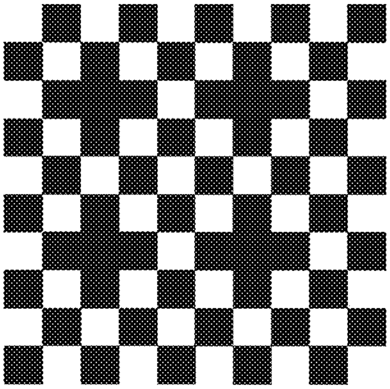

FIG. 35 shows an example of a pattern with fiducial markers (here exemplified as a cross).

Figure 36:
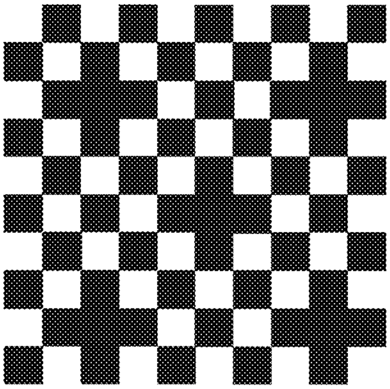

FIG. 36 shows an example of a pattern with fiducial markers (here exemplified as a cross).

Figure 37:
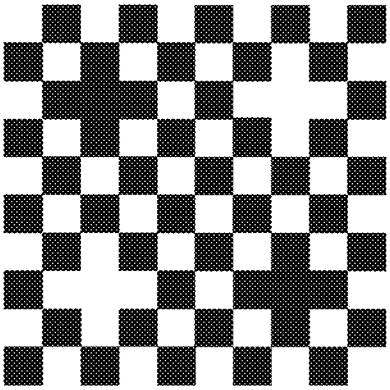

FIG. 37 shows an example of a pattern with fiducial markers (here exemplified as a cross).

DETAILED DESCRIPTION

Three-Dimensional Object

The three-dimensional (3D) object may be a dental object. Examples of dental objects include any one or more of: tooth/teeth, gingiva, implant(s), dental restoration(s), dental prostheses, edentulous ridge(s), and/or combinations thereof. Alternatively, the dental object may be a gypsum model or a plastic model representing a subject's teeth. As an example, the three-dimensional (3D) object may comprise teeth and/or gingiva of a subject. The dental object may only be a part of the subject's teeth and/or oral cavity, since the entire set of teeth of the subject is not necessarily scanned during a scanning session. A scanning session may be understood herein as a period of time during which data (such as images) of the 3D object is obtained.

Scanning Device

The present disclosure therefore relates to a scanning system, such as an intraoral 3D scanning device, for scanning a object, in particular a dental object, the system comprising

- at least one projector unit configured to project a light pattern of a predefined density on the dental object along a projector optical axis;
- one or more cameras, such as at least two cameras, having at least partly overlapping fields of view along different camera optical axes (and along the projector optical axis), each of said camera optical axes defining an angle with the projector optical axis, each of the cameras comprising an image sensor having an array of pixels, and
- one or more processors, wherein at least one processor is configured to generate a digital three-dimensional representation of the dental object based on triangulation between the cameras and the light pattern.

In general the present disclosure further relates to a dental scanning system for generating a digital representation of a three-dimensional (3D) object, the scanning system comprising a scanning device, such as an intraoral 3D scanning device, comprising:

- one or more projector units/projector units configured for projecting a predefined pattern, preferably in the form of a light pattern of a predefined density such that the pattern comprises a plurality of pattern features, onto the 3D object along a projector optical axis, i.e. each projector unit is associated with a projector plane;

one or more cameras, such as at least two or more cameras, (for each projector unit) having at least partly overlapping fields of view along different camera optical axes (and along the projector optical axis), each of said camera optical axes defining an angle with the projector optical axis such that each of the cameras has a predefined fixed position relative to the one or more projector units, wherein each camera is configured for acquiring images of at least a part of the object, wherein each of the cameras comprises an image sensor having an array of pixels, at least one processor/processing unit, preferably comprising means for carrying out any of the computer-implemented methods disclosed herein, e.g. configured to generate a digital three-dimensional representation of the 3D object based on triangulation between the cameras and the light pattern.

The scanning device may be a handheld intraoral 3D scanning device. The scanning device may comprise an elongated probe having a tip. The intraoral 3D scanning device may be configured to acquire images inside the oral cavity of a subject.

The scanning device may be an intraoral scanning device for acquiring images within an intraoral cavity of a subject. In preferred embodiments, the scanning device employs a triangulation-based scanning principle. The scanning device comprises at least one projector unit and at least one camera. Preferably, the scanning device comprises one or more scan units, e.g. as part of a handheld elongated probe having a tip, wherein each scan unit comprises a projector unit and one or more cameras. As an example, the scanning device may comprise one scan unit comprising one projector unit and one or more cameras, such as at least two cameras. As another example, the scanning device may comprise one scan unit comprising one projector unit and four cameras. In yet another example, the scanning device may comprise at least two scan units, wherein each scan unit comprises a projector unit and two or more cameras.

In particular, the cameras may be configured to acquire a set of images, wherein a correspondence problem is solved within said set of images based on triangulation. The images within the set of images may be acquired by separate cameras of the scanning device. The images within the set of images are preferably acquired simultaneously, i.e. at the same moment in time, wherein each camera contribute with one image to the set of images. An advantage hereof, is that the light-budget is improved; thus, less power is consumed by the light source and the projector unit. The images within the set of images preferably captures substantially the same region of the dental object. The images may comprise a plurality of image features corresponding to pattern features in a structured pattern projected on the surface of the dental object. The correspondence problem may generally refer to the problem of ascertaining which parts, or image features, of one image correspond to which parts of another image within the set of images. Specifically, in this context, the correspondence problem may refer to the task of associating each image feature with a projector ray emanating from the projector unit. In other words, the problem can also be stated as the task of associating points in the images with points in the projector plane of the projector unit.

The projector unit may be configured to project a plurality of projector rays, which are projected onto a surface of the dental object. Solving the correspondence problem may include the steps of determining image features in the images within a set of images, and further associate said image features with a specific projector ray. In preferred embodiments, the correspondence problem is solved jointly for groups of projector rays, as opposed to e.g. solving the correspondence problem projector ray by projector ray. The group of projector rays considered may form a connected subset within the pattern. The inventors have found that by solving the correspondence problem jointly for groups or collections of projector rays, a particular reliable and robust solution can be obtained, consequently leading to a more accurate 3D representation. Subsequently, the depth of each projector ray may be computed, whereby a 3D representation of the scanned object may be generated.

A projector unit may be understood herein as a device configured for generating an illumination pattern to be projected onto a surface, such as the surface of the three-dimensional object. The projector unit(s) may be selected from the group of: digital Light Processing (DLP) projectors, diffractive optical element (DOF) projectors, front-lit reflective mask projectors, micro-LED projectors, liquid crystal on silicon (LCoS) projectors, or back-lit mask projectors. In case of a back-lit mask projector, the light source is placed behind a mask having a spatial pattern, whereby the light projected on the surface of the dental object is structured or patterned. The back-lit mask projector may comprise one or more collimation lenses for collimating the light from the light source, said collimation lens(es) being placed between the light source and the mask. In preferred embodiments, the projector unit(s) of the scanning device comprise at least one light source and a mask having a spatial pattern. The mask may be a chrome-on-glass mask. In some embodiments, the projector unit(s) comprise a diffractive optical element as an alternative to a structured mask.

Examples of spatial patterns are shown in FIGS. 24-34. The spatial pattern may be a polygonal pattern comprising a plurality of polygons. The polygons may be selected from the group of: triangles, rectangles, squares, pentagons, hexagons, and/or combinations thereof. Other polygons can also be envisioned. In general, the polygons are composed of edges and corners. In preferred embodiments, the polygons are repeated in the pattern in a predefined manner. As an example, the pattern may comprise a plurality of repeating units, wherein each repeating unit comprises a predefined number of polygons, wherein the repeating units are repeated throughout the pattern.

The projector unit(s) may further comprise one or more lenses such as collimation lenses or projection lenses. The collimation lens(es) may be placed between the light source and the mask. In some embodiments, the collimation lenses comprise a first lens and a second lens, wherein there is a predefined ratio between the curvatures of the lenses, wherein said ratio is between 0.40 to 1.15, such as between 0.60 to 0.95. In some embodiments, the one or more collimation lenses are Fresnel lenses. The projector unit may further comprise one or more focus lenses, or lens elements, configured for focusing the light at a predefined working distance. Preferably, the projector unit(s) are configured to generate a predefined pattern, which may be projected onto a surface. Each of the projector units is associated with its own projector plane, which is determined by the projector optics. As an example, if the projector unit is a back-lit mask projector, the projector plane may be understood as the plane wherein the mask is contained. The projector plane comprises a plurality of pattern features of the projected pattern.

The projector unit may comprise an aperture having a predetermined size such that it provides a pupil diameter of between 0.2 mm to 0.7 mm, such as between 0.3 mm to 0.6 mm. In experiments performed by the inventors, a pupil diameter of between 0.2 mm to 0.7 mm was found to be particularly useful because it provided a projected pattern in particularly good focus in a large focus range, e.g. a focus range of between 16 mm and 22 mm. In particular, a pupil diameter between from about 0.3 mm to about 0.5 mm was found to provide a good compromise between the imaging resolution, e.g. the resolution of the pattern, and the depth of focus, i.e. the focus range. Depth of focus may in some cases be understood as the maximum range where the object appears to be in acceptable focus, e.g. within a given predetermined tolerance. In some embodiments, the aperture and/or pupil diameter is substantially the same for the projector unit and the cameras.

For some applications, e.g. for dental scanning applications, it is preferred that the scanning device has a working distance of between 10 mm and 100 mm. In experiments performed by the inventors, it has been found that a working distance of the projector unit of between 10 mm and 70 mm, such as between 15 mm and 50 mm, is particularly useful, since the optics, e.g. the scan unit(s), take up less space inside the scanning device, and also since it is desired to be able to scan objects very close to the scanning device. Since the optical system then takes up less space inside the scanning device, it also allows for multiple scan units to be placed in succession inside the scanning device. In preferred embodiments, the scanning device is able to project a pattern in focus at the exit of the tip of the scanning device, e.g. at the optical window of the scanning device or at an opening in the surface of the scanning device. The working distance may be understood as the object to lens distance where the image is at its sharpest focus. The working distance may also, or alternatively, be understood as the distance from the object to a front lens, e.g. a front lens of the projector unit. The front lens may be the one or more focus lenses of the projector unit.

In some embodiments, the choice of aperture and working distance results in a numerical aperture of the projector unit of between 0.0035 and 0.015, which was found to provide a good imaging resolution, i.e. a pattern with pattern features in good focus in a given focus range, and further a good compromise in terms of defocus, lens aberrations, and diffraction. In experiments performed by the inventors, a numerical aperture of the projector unit of between 0.005 and 0.009 was found to provide an ideal compromise between imaging resolution and depth of focus. Thus, a numerical aperture in this range was found to be the best balance between mitigating the negative effects on resolution caused by defocus, lens aberrations, and diffraction. The numerical aperture may be the same for the projector unit and the camera(s). The numerical aperture may be understood as the object-space numerical aperture.

The light source(s) may be configured to generate light of a single wavelength or a combination or range of wavelengths (mono- or polychromatic). The combination of wavelengths may be produced by a light source configured to produce light across a range of wavelengths, such as white light. In preferred embodiments, each projector unit comprises a light source for generating white light. The white light source may be used in combination with a mask to form a back-lit mask projector unit. Alternatively, the projector unit(s) may comprise multiple light sources such as LEDs individually producing light of different wavelengths (such as red, green, and blue) that may be combined to form light comprising different wavelengths. Thus, the light produced by the light source(s) may be defined by a wavelength defining a specific color, or a range of different wavelengths defining a combination of colors such as white light. In some embodiments, the projector unit comprises a laser, such as a blue or green laser diode for generating blue or green light, respectively. An advantage hereof is that a more efficient projector unit can be realized, which enables a faster exposure compared to utilizing e.g. a white light diode.

In some embodiments, the scanning device comprises a light source configured for exciting fluorescent material to obtain fluorescence data from the dental object such as from teeth. Such a light source may be configured to produce a narrow range of wavelengths, such as in the range of between 380 nm and 495 nm, such as between 395 nm to 425 nm. In some embodiments, the scanning device comprises one or more infrared light sources configured to emit infrared light, which is capable of penetrating dental tissue. Infrared light may be understood as light in the wavelength range of about 700 nm to about 1.5 μm. The scanning device may further comprise one or more NIR light sources, such as a plurality of NIR light sources, for emitting near-infrared light having a wavelength range of about 750 nm to about 1.4 μm. Light in the infrared range may be used for diagnostic purposes, e.g. for detecting regions of caries inside an oral cavity.

The projector unit may be configured for sequentially turning the light source on and off at a predetermined frequency, wherein the light source is on for a predetermined time period. As an example, the time period may be between 3 milliseconds (ms) and 10 milliseconds (ms), such as between 4 ms and 8 ms. The predetermined frequency for turning the light source on and off may be between 25 Hz and 35 Hz, such as approximately 30 Hz. In some embodiments, the exposure time of the image sensor is below 15 milliseconds (ms), such as below 10 ms, such as between 4 to 8 ms. These indicated exposure times preferably corresponds to the time period of the flash of the light source of the projector unit as described above. Thus, an advantage of configuring the light source to flash during a time period as indicated above, is that blurring due to relative movement between the scanner and the object being scanned is minimized. This kind of blurring is also referred to as motion blur. The light source of the projector unit may be configured to generate unpolarized light, such as unpolarized white light.

In some embodiments, the projector unit comprises a light source for generating white light. An advantage hereof is that white light enables the scanning device to acquire data or information relating to the surface geometry and to the surface color simultaneously. Consequently, the same set of images can be used to provide both geometry of the object, e.g. in terms of 3D data/a 3D representation, and color of the object. Hence, there is no need for an alignment of data relating to the recorded surface geometry and data relating to the recorded surface color in order to generate a digital 3D representation of the object expressing both color and geometry of the object.

The pattern is preferably defined by a mask having a spatial pattern. The pattern may comprise a predefined arrangement comprising any of stripes, squares, dots, triangles, rectangles, pentagons, hexagons and/or combinations thereof. In preferred embodiments, the generated illumination pattern is a checkerboard pattern comprising a plurality of checkers. Such a pattern is exemplified in FIG. 1. Similar to a common checkerboard, the checkers in the pattern have alternating dark and bright color corresponding to areas of low light intensity (black) and areas of high(er) light intensity (white). Hence, for ease of reference, the checkers of the checkerboard pattern will be referred to herein as white and black checkers.

The pattern comprises a plurality of pattern features. When projecting a pattern comprising such pattern features onto a surface of the 3D object, the acquired images of the object will similarly comprise a plurality of image features corresponding to the pattern features. A pattern/image feature may be understood as an individual well-defined location in the pattern/image. Examples of image/pattern features include corners, edges, vertices, points, transitions, dots, stripes, etc. In preferred embodiments, the image/pattern features comprise the corners of checkers in a checkerboard pattern. In other embodiments, the image/pattern features comprise corners in a polygonal pattern such as a triangular pattern.

A camera may be understood herein as a device for capturing an image of an object. Each camera comprises an image sensor for generating an image based on incoming light e.g. received from the illuminated 3D object. Each camera may further comprise one or more lenses for focusing light. As an example, the image sensor may be an electronic image sensor such as a charge-coupled device (CCD) or an active-pixel sensor (CMOS sensor). The image sensor may be a global shutter sensor or a rolling shutter sensor. An advantage of utilizing a rolling shutter sensor is that the sensor can be made smaller for a given pixel array size compared to e.g. a global shutter sensor, which typically comprises more electronics per pixel leading to a sensor having a larger area or volume footprint, thus taking up more space. Thus, a rolling shutter sensor is advantageous for applications with restricted space, such as for intraoral scanning devices, in particular for realizing a compact intraoral scanning device. Each image sensor may define an image plane, which is the plane that contains the object's projected image. In general, each image obtained by the image sensor(s) may comprise a plurality of image features, wherein each image feature originates from a pattern feature of the projected pattern. In some embodiments, there is a color filter array, such as a Bayer filter, arranged on the image sensor(s). The color filter array may comprise a mosaic of tiny color filters placed over the pixel sensors of each image sensor to capture color information.

In accordance with some embodiments, the scanning device comprises one or more processors configured for performing one or more steps of the described methods. The scanning device may comprise a first processor configured for determining image features in the acquired images. The first processor may be configured to determine the image features using a neural network. The first processor may be selected from the group of: central processing units (CPU), accelerators (offload engines), general-purpose microprocessors, graphics processing units (GPU), neural processing units (NPU), application-specific integrated circuits (ASIC), field-programmable gate arrays (FPGA), dedicated logic circuitry, dedicated artificial intelligence processor units, or combinations thereof. The scanning device may further comprise computer memory for storing instructions, which when executed, causes the first processor to carry out the step of determining image features in the acquired images.

The scanning device may further comprise a second processor configured for performing the steps of carrying out the computer-implemented method for generating a digital representation of a three-dimensional (3D) object. As an example, the second processor may be configured for running a tracking algorithm comprising the steps of:

- assigning one or more depth(s) to each image feature, wherein the depth(s) are determined using a triangulation method;
- generating image feature groups, wherein each image feature group comprises one or more image features;
- generating one or more seed proposals, wherein each seed proposal comprises at least a predefined number of image feature groups, wherein the generation of each seed proposal comprises the steps of:
- adding one or more image feature groups to a seed proposal based on one or more predefined first criteria;
- accepting seed proposal(s) comprising at least the predefined number of image feature groups; and
- generating a digital representation of the 3D object by adding seed proposal(s) to the digital representation based on one or more predefined second criteria.

The computer memory may further store instructions, which when executed, causes the second processor to carry out the method of generating a digital representation of a three-dimensional (3D) object. As an example, the second processor may be a central processing unit (CPU), a processor utilizing a reduced instruction set computer (RISC) instruction set architecture (such as an ARM processor) or another suitable microprocessor. The second processor may comprise computer memory. The first and second processor may both be located on the scanning device, and they may be operatively connected such that the first processor provides input to the second processor. Alternatively, the first processor may be located on the scanning device, and the second processor may be located on the computer system described herein. As an example, the first processor may be configured to determine image features in the images, and subsequently provide data related to the determined image features to the second processor. The data may comprise image feature coordinates as well as other attributes such as a camera index or a predefined property, such as the phase, of the image feature(s). The second processor may then be configured to generate the digital representation of the 3D object, e.g. in the form of a point cloud. The scanning device may be further configured to provide the digital representation to a computer system for rendering the representation. The computer system may further process the digital representation, e.g. by stitching the point clouds received from the scanning device and/or by fitting one or more surfaces to the stitched point clouds. This further processing by the computer system may also be referred to herein as reconstruction. The output of the reconstruction is a digital 3D model of the scanned object. The digital 3D model may be rendered and displayed on a display, e.g. connected to the computer system.

The scanning device is preferably configured to acquire sets of images, wherein a set of images comprises an image from each camera of the scanning device. As an example, if the scanning device comprises four cameras, the scanning device may continuously acquire sets of four images, wherein the correspondence problem is solved continuously within each set of images. The scanning device may be configured to solve the correspondence problem in two main steps: a first step, wherein image features in the images within a set of images are determined, and a second step, wherein 3D points are determined, e.g. based on triangulation. Finally, a 3D representation of the scanned object may be generated based on the 3D points. In some embodiments, the scanning device comprises a first processor, wherein the first processor is configured to execute the step of determining the image features in the images.

The scanning device preferably comprises a module for transmitting data, such as images or point clouds, to one or more external devices, such as a computer system. The module may be a wireless module configured to wirelessly transfer data from the scanning device to the computer system. The wireless module may be configured to perform various functions required for the scanning device to wirelessly communicate with a computer network. The wireless module may utilize one or more of the IEEE 802.11 Wi-Fi protocols/integrated TCP/IP protocol stack that allows the scanning device to access the computer network. The wireless module may include a system-on-chip having different types of inbuilt network connectivity technologies. These may include commonly used wireless protocols such as Bluetooth, ZigBee, Wi-Fi, WiGig (60 GHz Wi-Fi) etc. The scanning device may further (or alternatively) be configured to transmit data using a wired connection, such as an Ethernet cable.

Overview of One Solution to the Correspondence Problem

As disclosed previously the present inventors have solved the correspondence problem in a fast and reliable manner that enables a fast generation of the 3D representation by adding collections of image features for which the correspondence problem has been solved. Accordingly, instead of solving the correspondence problem feature by feature, the correspondence problem can be solved for collections of features, such that a consistent and reliable solution can be found for all features within the collection as also described in detail herein. A system and method for solving the correspondence problem is further described in PCT/EP2022/086763 and PA 2023 70115 by the same applicant, which are herein incorporated by reference in their entirety.

The images can be taken from a different point of view, at different times, or with objects in a scene in general motion relative to the camera(s). The correspondence problem can occur in a stereo situation when two images of the same object are acquired, or it can be generalised to an N-view correspondence problem. In the latter case, the images may come from either N different cameras photographing at the same time or from one camera which is moving relative to the object/scene. Similarly, a correspondence problem occurs in the case of one camera and one projector for a triangulation-based scanning device. The problem is made more difficult when the objects in the scene are in motion relative to the camera(s).

In accordance with preferred embodiments of the presently disclosed method, the method comprises the steps of:

- acquiring two or more images of a three-dimensional (3D) object, wherein each image comprises a plurality of image features;
- determining the image features in each of the images;
- determining one or more depth(s) associated with each image feature using a triangulation method;
- generating image feature groups, wherein each image feature group comprises one or more image features;
- generating one or more seed proposals, wherein each seed proposal comprises at least a predefined number of image feature groups, wherein the generation of each seed proposal comprises the steps of:
- adding one or more image feature groups to a seed proposal based on one or more predefined first criteria;
- accepting seed proposal(s) comprising at least the predefined number of image feature groups; and
- generating a digital representation of the 3D object by adding seed proposal(s) to the digital representation based on one or more predefined second criteria.

Thereby, when generating the digital representation, entire collections of image features may be added to the representation. Thereby, the presently disclosed method offers a more robust and reliable solution to the correspondence problem within dental scanning systems.

The two or more images of the three-dimensional (3D) object may be acquired using a scanning device such as the presently disclosed intraoral 3D scanning device. The scanning device may be configured for providing/transmitting the images to a processor and/or a computer system, said processor/computer system comprising means for carrying out at least some of the steps of the computer-implemented methods disclosed herein. Accordingly, the steps of the above described method may be performed by one or more processors or a computer system. In preferred embodiments, the scanning device comprises one or more processors configured for performing, at least partly, any of the computer-implemented methods disclosed herein.

The following description serves to outline the disclosed method on a general level. A more detailed description of the system and method is provided elsewhere herein. The first step of the method is to acquire two or more images of a three-dimensional (3D) object, wherein each image comprises a plurality of image features. Typically, the two or more images will be acquired by a scanning device, such as the presently disclosed scanning device, comprising one or more cameras for acquiring images. The scanning device further comprises one or more projector units for projecting a predefined pattern onto a surface of the 3D object. The projected pattern comprises a plurality of pattern features, such that the acquired images similarly comprise a plurality of image features. As an example, the projected pattern may be a light pattern, such as a checkerboard pattern, wherein the image/pattern features are defined as the corners of the checkerboard pattern. Other examples are provided in the detailed description.

A next step of the method is to determine the image features, preferably in each of the acquired images. This may be done using a neural network trained to determine the image features. A next step of the method may be, for each pattern feature/projector ray, to associate a number of image features among the determined image features to the pattern feature/projector ray. Each pattern feature may be associated with zero or more image features, such as one or more image features, such as a plurality of image features. A next step of the method may be to determine, for each image feature, one or more possible depths of the image feature. Accordingly, several depths may be assigned to each image feature, since at this point it is not known which depth is the true solution to the correspondence problem for that particular image feature. The depth(s) is preferably determined by triangulation. A depth may be understood as the distance from the projector location along a given projector ray to a point in 3D, where said projector ray intersects a camera ray within a given tolerance/distance. In particular, a triangulation approach may be utilized in case each camera of the scanning device has a predefined fixed position relative to one or more projector units, in particular if this fixed position corresponds to an angle formed between a viewing axis of the camera and corresponding projector unit axis.

A next step of the method may be to sort the Image features associated to a given pattern feature/projector ray according to depth. This sorting is preferably performed/repeated for all pattern features. The sorted image features may be stored in a list. Then, the method may comprise the step of grouping image features in groups of predefined size, thereby generating image feature groups. This step may be performed iteratively, wherein a sliding window is used to look through the sorted list of image features to determine groups of image features each having a unique camera index, i.e. such that image features within the same group originates from images obtained using different cameras. A sliding window should in this context be understood as a mathematical technique, wherein a sub-list (sub-array) runs over an underlying collection/list/array. The sliding window technique is a well-known technique within mathematics. As an example, in case the scanning device comprises a projector unit and four cameras, the sliding window may have an initial size of four elements, such that initially groups of four image features are generated. In a next iteration, the size of the sliding window may be decreased such that groups of three image features are generated and so forth. This approach may be performed for all pattern features in the pattern.

A next step of the method may be to generate collections of image feature groups, said collections also referred to herein as seed proposals. A seed proposal preferably comprises at least a predefined number of image feature groups. Accordingly, a seed proposal is generated such that it comprises equal to or more than the predefined number of image feature groups. Image feature groups are preferably added to a seed proposal according to one or more first criteria, examples of which are given in the detailed description.

A next step of the method is to generate a digital representation of the 3D object based on the seed proposal(s). The digital representation may be in the form of one or more point clouds comprising a plurality of 3D data points. The digital representation may be provided to a computer system for reconstructing a digital 3D model (e.g. a 3D surface model) based on the representation. The reconstruction may comprise the step of stitching point clouds received from the scanning device, and it may further comprise the step of fitting one or more surfaces to the stitched point clouds whereby a 3D surface model (digital 3D model) is generated. The 3D model may be rendered by a computer system and displayed on a display.

Accordingly, the method provides a framework for generating a digital representation of a 3D object, wherein the correspondence problem is solved for collections of image features, such that features within such a collection are considered to form a consistent and reliable solution to the correspondence problem.

Light Pattern and Characterization Thereof

As stated previously the density of the projected light pattern is advantageously selected such that a density measure of the projected light pattern is above a predefined threshold in order to increase the detail in the digital representation of the scanned object.

The density measure is an indicator for the amount of information carried in the pattern and there are different ways to define the density measure such that it can be measured objectively. In many instances the light pattern can be characterized by similar features, e.g. only two different features, that are merely repeated in the pattern in both dimensions. A checkerboard pattern is an example of such a pattern, e.g. a pattern of alternating black and white squares. The density measure as used herein may then simply be the total number of squares in the checkerboard pattern. However, there are many other types of patterns with similar pattern features that are suitable for the present purpose. The similar pattern features may for example be selected from the group of: checkers, triangles, hexagons, dots, lines and striped lines. Hence, in general the light pattern may comprise a predefined number of similar pattern features. The density measure can then be defined as the total number of similar pattern features in the pattern. In preferred embodiments, the light pattern is non-coded such that no part of the pattern is unique. The light pattern may be a static light pattern, i.e. a pattern that does not change in time. The light pattern may be a structured light pattern having a distribution of discrete unconnected spots of light, wherein said spots of light corresponds to pattern features.

In preferred embodiments, the light pattern is a polygonal pattern comprising a plurality of polygons. The polygons may be selected from the group of: triangles, rectangles, squares, pentagons, hexagons, and/or combinations thereof. The polygons may be composed of edges and corners, wherein the pattern features correspond to the corners in the pattern. Preferably, the polygons are repeated in the pattern in a predefined manner. As an example, the pattern may comprise a plurality of repeating units, wherein each repeating unit comprises a predefined number of polygons, wherein the repeating units are repeated throughout the pattern. Preferably, the light pattern comprises a high number of polygons and/or pattern features, such as at least 3000, or at least 10000, preferably at least 15000, even more preferably at least 19000. The number of polygons and pattern features does not need to be the same. As an example, a polygonal pattern comprising 100×100 squares (each square constituting a polygon) will have a total of 10000 squares/polygons. If a pattern feature is understood as an intersection of four squares, such a pattern would have 99×99 pattern features, i.e. 9801.

In some embodiments, the light pattern constitutes a polygonal pattern comprising a repeating pattern of squares, e.g. a checkerboard, wherein a pattern feature is understood as a corner of any given square. Hence, such an embodiment and definition would imply, for a pattern of 100×100 squares, that the pattern comprises 10201 pattern features if all corners are included, including those at the outer boundary of the pattern. In general, most preferred embodiments of the light pattern comprise a high number of polygons as well as pattern features. A checkerboard pattern is a pattern that can carry a particularly high number of pattern features, because each black square is surrounded by white squares and each white square is surrounded by black squares. In some embodiments, each checker in the checkerboard pattern has a length of between 100 μm to 200 μm. This may in some cases correspond to a pixel size of between 4-16 pixels, such as 8-12 pixels, when the pattern is imaged on the image sensor(s). Through experiments the inventors have realized that at least 4 resolvable pixels per checker period is sufficient to get a reasonable contrast and well-defined edges of the projected checkerboard pattern. In some embodiments, the pattern comprises at least 100×100 checkers arranged in a checkerboard pattern, e.g. of the size mentioned above. Such a pattern has a high number of pattern features, e.g. wherein the corners of the checkers constitute features. Consequently, such a pattern sets high requirements to the optical system of the scanning device. Thus, the pattern of light may resemble a checkerboard pattern with alternating checkers of different intensity in light. In other embodiments, the light pattern comprises a distribution of discrete unconnected spots of light.

Another way to objectively define the density measure of the projected light pattern analyse/measure the projected pattern in an area A on plane surface. The density measure can for example be defined as $\int_A \|I\|^2 \, dA$, where $$\|I\|^2 = \left(\frac{\partial I}{\partial x}(x, y)\right)^2 + \left(\frac{\partial I}{\partial y}(x, y)\right)^2,$$

and where I=I(x, y), 0≤I(x, y)≤1, is an intensity signal measured in the area A. Such a definition of the density measure can be used on any type of light pattern, because it is merely a parameter providing a number of measured intensity changes integrated over the area A. If the light pattern comprises a predefined number of similar pattern features, e.g. a checkerboard pattern as exemplified below, this more generalized density measure is not necessarily equal to the number of similar pattern features, but it at least scales with the number of similar pattern features, e.g. measured in an area A on a plane surface.

In some situations, in order to objectively characterize the pattern, the distance from the tip of the probe to the plane surface can advantageously be selected such that the projected light pattern is at least substantially in focus, thereby emulating the situation during scanning, where the pattern is clearly outlined on the scanned object. It might be necessary to specify the distance from the tip of the probe to the plane surface with the area A, this distance can for example be between 5 and 50 mm, preferably 15 mm, which corresponds to a typical distance between a tooth being scanned and the tip of a handheld probe of an intraoral scanning device during intraoral scanning.

Many different type of standard light sensors can be used for such a measurement. It might be necessary to define the noise of the sensor, for example it can be defined that the intensity signal I is measured with a sensor with a predefined sensor noise with a magnitude of 1% at peak value, i.e. the pattern is characterized by measure the signal in the area A with a sensor such that the noise has magnitude 1% at the peak value. However, a quite objective approach would be to measure the intensity signal by means of a beam profiler, e.g. the scanning device can be arranged such that the light pattern is projected onto a plane surface above a beam profiler.

The area A can for example be between 100 and 5000 $mm^2$, preferably between 100 and 1000 $mm^2$, for example 400 $mm^2$, e.g. an area of 20 mm×20 mm, which would correspond to a typical viewing area of an intraoral scanning device during intraoral scanning.

The generalized density measure defined as $\int_A \|I\|^2 \, dA$ is preferably at least 10000, more preferably at least 20000, even more preferably at least 30000, most preferably 35000, even possibly more than 40000, where A preferably is between 100 and 1000 $mm^2$, such as for example 400 $mm^2$.

The light pattern may also be combination of pattern with similar pattern features, as exemplified above, and another type of light pattern, e.g. a coded pattern or a random or pseudo random pattern. In that regard it is preferred that at least 50%, more preferably at least 75%, most preferably at least 90% or even 100% of the light pattern is a pattern with similar repeated pattern features.

Examples

Consider a checkerboard pattern projected by a projector with focal length 0.7 mm and checkers of size 7 μm. At a distance of 15 mm to the projector, a window of size 20 mm by 20 mm will contain a grid of 140×140=19600 of such checkers. This checkerboard pattern is illustrated in FIG. 20. Assume that the radius of the aperture in the projector is 0.1 mm—this determines the degree of diffraction of the pattern. Assume that the noise of the sensor used for measuring the pattern in this scenario is purely shot noise and that the magnitude is 1% at peak value. The resulting sensor signal is illustrated in FIG. 21. The integral can be computed by summing the values of the above image and multiplying with the area of each pixel, in this case giving a density measure of the signal in FIG. 21 of approximately 36993.

For comparison, a random pattern is shown in FIG. 22. As above assume that the radius of the aperture in the projector is 0.1 mm—this determines the degree of diffraction of the pattern. Assume that the noise of the sensor used for measuring the pattern in this scenario is purely shot noise and that the magnitude is 1% at peak value. The resulting sensor signal is illustrated in FIG. 23. The integral can be computed by summing the values of the above image and multiplying with the area of each pixel, in this case giving a density measure of the signal in FIG. 22 of approximately 24342, i.e. a significantly lower density measure than the checkerboard pattern, thereby also demonstrating that a pattern with similar repeated features, like a checkerboard pattern, is very efficient when a high-density pattern is needed, i.e. there is simply a high number of features in a checkerboard pattern which transforms directly into an increased number of features and details in the digital representation of the scanned object—if the correspondence problem is solved accordingly.

The examples show that light patterns with repeated pattern features are preferred because the density of information in such patterns are simply higher. It is also much easier to determine an objective density measure of a light pattern with repeated pattern features because it can merely be a matter of counting the number a similar pattern features, e.g. counting checkers in a checkerboard pattern, either in total or in a predefined area. However, as also demonstrated in the examples a generalized approach to objectively determine a density measure is necessary for light patterns with non-trivial/non-repeated patterns, such as random or pseudo-random light patterns.

Pattern with Fiducial Markers

In some embodiments, the pattern comprises a predefined number of fiducial markers. As an example, the pattern may comprise at least one fiducial marker for every pattern features, or for every 25 pattern features, or for every 50 pattern features, or for every 100 pattern features. Some examples are shown in FIGS. 35-37. A fiducial marker may be understood as a unique local part of the pattern, which may be identified from the remaining pattern. The fiducial marker may constitute a unique geometry, which allows it to stand out from the rest of the pattern, whereby it may easily be identified. The fiducial markers may be either dark (black), bright (white), or combinations thereof, as illustrated in FIG. 37.

As an example, the geometry of the fiducial markers may be selected from the group of: dots, triangles, rectangles, squares, pentagons, hexagons, polygons and/or combinations thereof. In some embodiments, each fiducial marker resembles a cross. As an example, the light pattern may constitute a checkerboard pattern comprising alternating squares of black and white, and the pattern may comprise at least one fiducial marker for a block of 10 by 10 squares in the checkerboard pattern. The fiducial markers may constitute a sub-pattern within the larger (global) pattern. The sub-pattern may be described by a predefined spatial frequency between the fiducial markers. As another example, there may be one or more predefined distance(s) between the fiducial markers. Thus, the sub-pattern may be characterized by one or more parameters, such as distance between the fiducial markers, geometry of the fiducial markers, brightness of the fiducial markers (dark/bright).

In some embodiments, a processor of the scanning device is configured to identify the fiducial markers in the projected pattern. As an example, the processor may be configured to identify the fiducial markers using a neural network. In other words, the neural network may be trained to identify the fiducial markers in the pattern. An advantage of using a pattern with fiducial markers, wherein the processor of the scanning device is configured to identify the fiducial markers in the pattern, is that it enables a more robust and/or reliable solution to the correspondence problem, which may be used as input to update a geometry model associated with the scanning device. A more reliable solution may be understood as a solution, wherein fewer candidate points are considered for each projector ray, whereby the risk of assigning the points to the projector ray incorrectly is reduced. A more robust approach may be understood as an approach being more resilient to any possible errors in the geometry model.

In general, the correspondence problem becomes increasingly more computationally heavy to solve, the denser the pattern is. Thus, by providing a pattern with fiducial markers, the global pattern effectively has two different densities: A first density related to a first group of pattern features, and a second density related to a second group of pattern features. As an example, if the pattern is a polygonal pattern, the first group of pattern features may be the corners of the polygons in the pattern. The fiducial markers may constitute a second group of pattern features, where the pattern formed by the fiducial markers is less dense than the first group of pattern features. The correspondence problem may then be solved first for the pattern made of the fiducial markers, by identifying the fiducial markers in the pattern. This solution can be used to correct/adjust the mathematical geometry model, whereby the scanning device can be dynamically calibrated, i.e. calibrated on-the-fly, preferably in real-time. Preferably, the pattern formed by the fiducial markers is significantly less dense than the remaining pattern, such that the correspondence problem related to the fiducial markers may be solved much faster. The correspondence problem may be solved in a similar way as presented elsewhere herein. Alternatively, the correspondence problem related to the fiducial markers may be solved using any known techniques for solving correspondence problems.

Dynamic Calibration

An advantage of solving the correspondence problem initially for the fiducial markers is that the solution may be used to dynamically calibrate the scanning device. As mentioned previously, the optical system of the scanning device is typically modelled mathematically by a geometry model. The geometry model may include the relative positions and orientations of the cameras and projectors in relation to each other. The geometry model may further include internal parameters related to the cameras and projectors, such as the focal length of these components. Additionally, the geometry model may include one or more lens models for the projectors and model the distortion in the image/pattern due to the lenses. Thus, in some embodiments, the one or more parameters of the mathematical geometry model are selected from the group of: position of the camera(s), orientation of the camera(s), intrinsic parameters of the camera(s), and/or combinations thereof. Some examples of intrinsic parameters include the focal length of the camera(s), the offset of a lens in the camera(s), distortion of one or more lenses inside the scanning device, and/or combinations thereof.

The geometry model is typically updated during a calibration, e.g. from factory. If the physical configuration of the scanning device has changed since the time of calibration, e.g., due to thermal expansion, wear and tear or general degradation of the materials, then the geometry model will not be accurate anymore (e.g., the relative positions of the cameras and projectors may change). Consequently, depth determination, e.g. the determination of 3D points by triangulation, becomes less accurate. In some cases, the accuracy may be so low that the correspondence problem can no longer be solved reliably. Therefore, it is desired to calibrate the scanning device dynamically, i.e. over time, even during scanning. This may be achieved by solving the correspondence problem for the fiducial markers and then using that solution as an input/constraint for updating the geometry model associated with the scanning device. Consequently, the generation of the digital 3D representation becomes more accurate.

In the following it is outlined how the geometry model may be updated on-the-fly, e.g. during a scanning session. The scanning device is assumed to project a pattern having a plurality of fiducial markers, said markers defining a sub-pattern within the projected pattern. The sub-pattern is less dense than the remaining pattern, i.e. the number of fiducial markers is less than the number of image features in the entire pattern. Consequently, the correspondence problem is computationally easier and faster to solve for the sub-pattern defined by the fiducial markers. Once a solution is determined, this implies that in each image, there is a number of image features for which the correspondence problem is solved, i.e. it is known from which projector ray said features originate from. If image features in a number of different images (obtained from different cameras) correspond to the same projector ray, then 3D camera rays corresponding to those image features should intersect exactly at the same point in 3D. Thus, in case they are not intersecting exactly, the parameters of the geometry model can be changed by minimizing the distance between camera rays corresponding to the same projector rays. Accordingly, the mathematical geometry model can be updated based on the solution found in relation to the pattern defined by the fiducial markers. Thus, in some embodiments the step of calibrating the scanning device comprises the steps of mathematically projecting one or more camera rays and projector rays together in 3D space, said rays associated with the fiducial markers; and minimizing the distance between the camera rays and a given associated projector ray by dynamically adjusting one or more parameters of the mathematical geometry model. In some embodiments, the calibration is performed in real-time during scanning.

Alternatively, instead of using the solution to the correspondence problem based on identifying the fiducial markers, another set of image features may be used instead. The important thing is to use a set of points for which the correspondence problem can be reliably solved. In the present disclosure, it is outlined how the correspondence problem can be solved for collections of image feature groups, wherein a consistent and reliable solution can be found within said collection. It is further described how to assess the reliability of the image feature groups, i.e. how much can a potential solution be trusted to be the true solution. Thus, in some cases it might be that a collection of image feature groups is found to be particularly reliable (e.g., if a pattern feature is observed/imaged by many cameras simultaneously, and/or if the camera rays and projector ray pass particularly close to each other or if the collection is of a certain size). Then, that solution may form the basis for updating the geometry model as outlined previously.

Thus, in some embodiments, one or more processor(s) of the scanning device are configured to identify one or more image features within a first set of acquired images, and solve a correspondence problem related to said image features, wherein the correspondence problem is solved such that points in 3D space are determined based on the identified image features, wherein said points form a solution to the correspondence problem; and wherein the processor(s) is configured to calibrate the scanning device by adjusting one or more parameters of the mathematical geometry model associated with the scanning device, wherein the adjustment is based on the solution to the correspondence problem.

Computer System

A computer system may be understood as an electronic processing device for carrying out sequences of arithmetic or logical operations. In the present context, a computer system refers to one or more devices comprising at least one processor, such as a central processing unit (CPU), along with some type of computer memory. Examples of computer systems falling within this definition include desktop computers, laptop computers, computer clusters, servers, cloud computers, quantum computers, mobile devices such as smartphones and tablet computers, and/or combinations thereof.

The computer system may comprise hardware such as one or more central processing units (CPU), graphics processing units (GPU), and computer memory such as random-access memory (RAM) or read-only memory (ROM). The computer system may comprise a CPU, which is configured to read and execute instructions stored in the computer memory e.g. in the form of random-access memory. The computer memory is configured to store instructions for execution by the CPU and data used by those instructions. As an example, the memory may store instructions, which when executed by the CPU, cause the computer system to perform, wholly or partly, any of the computer-implemented methods disclosed herein. The computer system may further comprise a graphics processing unit (GPU). The GPU may be configured to perform a variety of tasks such as video decoding and encoding, rendering of the digital representation, and other image processing tasks. In some embodiments, a NPU or a GPU is configured to perform the step of determining image features using a neural network.

The computer system may further comprise non-volatile storage in the form of a hard disc drive. The computer system preferably further comprises an I/O interface configured to connect peripheral devices used in connection with the computer system. More particularly, a display may be connected and configured to display output from the computer system. The display may for example display a 2D rendering of the generated digital 3D representation. Input devices may also be connected to the I/O interface. Examples of such input devices include a keyboard and a mouse, which allow user interaction with the computer system. A network interface may further be part of the computer system in order to allow it to be connected to an appropriate computer network so as to receive and transmit data (such as scan data and images) from and to other computing devices. The CPU, volatile memory, hard disc drive, I/O interface, and network interface, may be connected together by a bus.

The computer system is preferably configured for receiving data from the scanning device, either directly from the scanning device or via a computer network such as a wireless network. The data may comprise images, processed images, point clouds, sets of data points, or other types of data. The data may be transmitted/received using a wireless connection, a wired connection, and/or combinations thereof. The computer system may be configured for performing any of the computer-implemented methods disclosed herein, either fully or partly. In some embodiments, the computer system is configured for carrying out the computer-implemented method for generating a digital representation of a three-dimensional (3D) object as described herein. In some embodiments, the computer system is configured for receiving data, such as point clouds, from the scanning device and then subsequently perform the steps of reconstruction and rendering a digital representation of a three-dimensional (3D) object. Rendering may be understood as the process of generating one or more images from three-dimensional data. The computer system may comprise computer memory for storing a computer program, said computer program comprising computer-executable instructions, which when executed, causes the computer system to carry out the method of generating a digital representation of a three-dimensional (3D) object.

Acquiring Images

Figure 3:
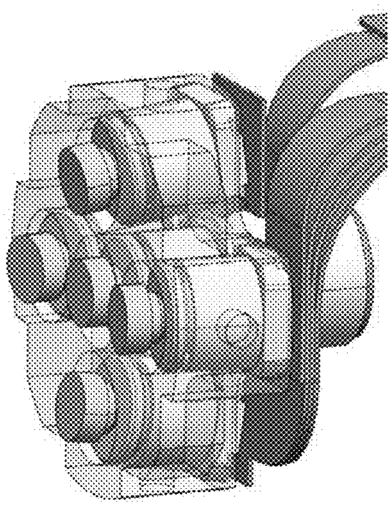
FIG. 3 shows an embodiment of a scan unit according to the present disclosure.

In accordance with preferred embodiments of the present disclosure, the method comprises the step of acquiring images of a three-dimensional (3D) object. The images are preferably acquired using a scanning device comprising one or more scan units, wherein each scan unit comprises a projector unit and one or more cameras. An embodiment of a scan unit according to the present disclosure is shown in FIG. 3. The center-to-center distance between the projector unit and a given camera of that scan unit may be between 2 to 5 mm, preferably between 3 to 4 mm. The scanning device may be an intraoral scanning device for acquiring images inside the oral cavity of a subject. The projector unit(s) of the scanning device are configured for projecting a predefined illumination pattern, such as a static light pattern, onto a surface, e.g. onto the surface of the three-dimensional object. Once projected on the surface, some light will be reflected from the surface, which may then enter the camera (s) of the scanning device, whereby images of the 3D object can be acquired.

The images are preferably acquired using one or more cameras per projector unit, such as at least two cameras or at least four cameras for each projector unit. In preferred embodiments, each scan unit of the scanning device comprises a projector unit and four cameras. The field of view of the cameras are preferably overlapping. An advantage of having overlapping fields of view of the cameras is an improved accuracy due to reduced amount of image stitching errors. A further advantage of utilizing multiple cameras, such as two or more cameras, is that the reliability of the determination of 3D points is improved, whereby the accuracy of the generated 3D representation is improved. The images may be processed by a processor located on the scanning device, and then subsequently transmitted to the computer system. The images may also be transmitted, without any processing, to the computer system. In some embodiments, both raw images and processed images are transmitted by the scanning device to a computer system. In some embodiments, a processor located on the scanning device, receives the images as input and provides one or more point clouds as output by executing one or more steps of the disclosed computer-implemented method.

Determining Image Features

In preferred embodiments of the presently disclosed method, the method comprises the step of determining image features in the acquired images. This step is preferably performed by a processor, which may be located on the scanning device or on the computer system. Preferably, this step includes determining all image features in each image acquired by each camera. In accordance with preferred embodiments, the image features are determined using a neural network, which is trained to identify image features based on input data comprising images. An example of how the neural network is trained is provided elsewhere in the description. The neural network may form part of a computer program configured to run on a processor, e.g. located on the scanning device.

The neural network may be configured to receive a plurality of the acquired two-dimensional images as input and then for each image output the determined image features in the image as well as the phase of said features. In particular, the plurality of 2D images may be acquired by multiple cameras, such that sets of 2D images are obtained, wherein a set of images comprises at least one image from each camera. The correspondence problem may then be solved for said sets of 2D images as described herein. In preferred embodiments, the image features are corners in a checkerboard pattern. As explained previously, the images are obtained by projecting an illumination pattern onto the surface of the object, and then acquiring images of light reflected from said object. Accordingly, the acquired images will comprise a pattern similar to the projected pattern, however the pattern in the images may be distorted due to the contour of the surface of the object compared to the mask pattern.

Since the projected pattern comprises a plurality of pattern features, such as corners in a checkerboard pattern, the acquired images will similarly comprise a plurality of image features. Each image feature originates from a pattern feature. One problem is then to figure out how to match features in the images with the corresponding features in the projector plane. This problem is also generally known as the correspondence problem in computer vision and stereo vision. If multiple images are acquired by multiple cameras, i.e. at least one image for each camera, then the correspondence problem may be stated as how to identify corresponding image features in each of the acquired images, i.e. which image features in one image correspond with which image features in another image, and furthermore which image features correspond with which pattern features. The projector plane may mathematically also be viewed as an image plane, even though the pattern of the projector plane is known a priori. Hence, the pattern features are known beforehand. Accordingly, it is an object of the present disclosure to describe a method that solves the correspondence problem in a new and efficient way.

Training of the Neural Network

The neural network may be trained using supervised learning where a set of example inputs is provided along with desired outputs for each input. The set of example inputs and outputs may constitute the training dataset for the neural network. The difference between the output of the network and the desired output can be quantified according to some cost function, e.g., cross entropy. Furthermore, one or more parameters of the neural network may be adjusted during the training to minimize the cost function using standard techniques such as gradient descent, backpropagation etc. If the set of example inputs and outputs (the training dataset) is large enough, the neural network is able to deliver outputs close to the desired ones, also for inputs never encountered during training.

The desired output for a given input depends on what the neural network is required to do. In some embodiments, the desired outputs include pixel level annotation of where the features of a structured light pattern are located, i.e. the location of pattern features, a pixel level depth map of the corresponding 3D surface or labels for classifying pixels into light and dark checkers.

The training dataset may include digital renderings of dental objects based on existing 3D representations. This enables the desired output to be calculated so that no manual annotation is required. Furthermore, the position at various times of the intraoral scanning device used to generate the original 3D representations may be recorded and used as the pose from which to render training images. This may improve the neural network such that it performs better in realistic poses used during scanning.

Parameters of the rendering may be varied across the different images used for training such as exposure, color balance and camera parameters. This can create more data without the need to perform more rendering and can make the network more robust to changes in illumination, geometry etc.

Some parts of the training dataset can be made to simulate diffuse surfaces such as gypsum, e.g., by suppressing specular reflection and subsurface scattering. This can ensure that the network will also perform well on other materials than enamel and gingiva. The training dataset may be chosen to overrepresent challenging geometries such as scan flags, preparations and margin lines. This makes it more likely that the network will deliver desired outputs for such situations in the field.

Generating Neighborhood Graphs

A neighborhood graph may be understood herein as a two-dimensional (2D) map (or a discrete graph) comprising the position(s) of a plurality of image features associated with an image. The neighborhood graph preferably further comprises predefined properties of these features such as their phase in the pattern as well as neighborhood information about each feature to be described in more detail below. The image feature position(s) may be defined by image coordinates. Image coordinates may be understood as numerical coordinates, e.g. defined in a pixel coordinate system or a cartesian coordinate system. As an example, the image coordinates may comprise an x-coordinate and a y-coordinate, such that the pair (x, y) uniquely defines the position of the image feature in the image. Each pair may further be associated with an intensity corresponding to the pixel intensity or gray level of the image at the point defined by those coordinates. The neighborhood graph may comprise additional information such as one or more predefined properties of the image features as well as a camera index denoting which camera obtained the image associated with the neighborhood graph. The camera index may also be an attribute of the image features in the neighborhood graph such that image features within the same neighborhood graph have the same camera index. As an example, the projected pattern may be a checkerboard pattern with alternating checkers of black and white. Each checker can be described as having four corners, four edges, and a color (black/white). In this example, the image features and pattern features may constitute the corners of the checkers. Consequently, each of said image/pattern features (here corners) is associated with a phase, which can take only two values (binary). Accordingly, an example of a predefined property of the image features is the phase. The phase can be either black-white (BW) or white-black (WB). A corner in a checkerboard pattern will be surrounded by four checkers, wherein two of said checkers are black and the other two are white. A phase of BW corresponds to a corner, wherein the top left checker is black, and the top right checker is white. A phase of WB is exactly opposite the phase of BW. Hence a phase of WB corresponds to a corner, wherein the top left checker is white, and the top right checker is black. The phase could equally well be defined by the bottom checkers, i.e. the checkers below the corner, instead. The phase could also be defined by all the four checkers surrounding the corner. However, for simplicity, the phase is defined from only two of the four checkers. As mentioned previously, 'white' may be understood as referring to areas of higher light intensity than 'black'. Ideally, the transition between white and black checkers is completely sharp, however, in reality the transition is somewhat smeared out due to blurring.

In accordance with preferred embodiments, the method comprises the step of determining image features, such as corners, in the acquired images, e.g. using a neural network. The neural network is preferably further configured to determine the predefined properties, e.g. the phase, of the image features. This may be performed simultaneously with the determination of the image features. The neural network may be further configured to determine the color of the checkers, i.e. in order to classify each pixel in the images as either black or white. An advantage of using a projection pattern wherein each pattern feature is associated with a phase, which can take only two values, is that the correspondence problem is reduced to two smaller correspondence problems, which are easier to solve. Consequently, the reduced problem imposes less requirements on the system both computationally and physically. Thereby, the correspondence problem becomes computationally faster to solve. It is generally desired to solve the correspondence problem as fast as possible to generate the digital representation of the three-dimensional (3D) object continuously and preferably in real-time.

In the projector pattern, each pattern feature will generally be surrounded by a number of adjacent/neighboring pattern features, such as eight neighbors in the case of a checkerboard pattern (except near boundaries). For each feature, the neighborhood graph may store references to the other features in the graph corresponding to those neighbors. In the case of a checkerboard pattern, these neighbors may be found by removing a part of the image around each feature and flood-filling the regions adjacent to the feature in question according to pixel classification into either black or white pixels. The neighbors can then be found as the features on the borders of the flood-filled regions. Furthermore, if the neighbors around a given feature in the projector pattern are ordered in some way, e.g., starting from the upper left corner and going clockwise, the neighbors in the image can be ordered in the same way, so that for each neighbor index in the projector pattern the neighborhood graph stores a reference to the corresponding neighbor feature in the image, provided it exists.

Accordingly, the method may comprise the step of generating a neighborhood graph for each image, wherein the generation of each of the neighborhood graphs comprises the step of determining, for each of the acquired images, a plurality of image features, wherein each image feature corresponds to a pattern feature, and wherein each image feature is associated with a set of image coordinates in 2D, a camera index indicating which camera acquired the image and predefined properties such as the phase of the feature. Finally, the generation of the neighborhood graph preferably comprises a step of storing references for each feature to the neighboring features in the graph as described above.

Rejecting Image Features

In some embodiments, the method comprises the step of determining, according to one or more predefined criteria, whether one or more of the determined image features should be rejected. Examples of predefined criteria include: Is the phase of the image features similar to the phase of the pattern features in the projector plane? Is the phase of neighboring image features correct in a predefined area surrounding each image feature? In the case of a checkerboard pattern, is the length of the edges of the checkers surrounding the evaluated image feature correct, i.e. does it correspond with the length of the edges in the pattern in the projector plane? In case one or more of said criteria is not met, i.e. if the answer to one or more of the aforementioned questions is no, the image feature under evaluation may be rejected. In some embodiments, an image feature is only rejected if two or more of the predefined criteria are not met. The neighborhood graph(s) may be updated in case any image features are rejected, such that each neighborhood graph only comprises non-rejected image features.

Associating Image Features to Pattern Features

At this point, a neighborhood graph comprising information of the image features (position, neighbor information and other properties such as phase) has preferably been generated for each of the acquired images. As a next step, the method may comprise the step of associating image features to pattern features. Each pattern feature may be associated with a number of image features, such as zero or more image features. To associate image features to pattern features any suitable techniques may be used, such as techniques employing projective geometry or epipolar geometry.

This paragraph serves to illustrate one example of how image features may be associated to pattern features using epipolar geometry. In general, epipolar geometry describes the relation between two resulting views, i.e. when two cameras obtain an image of the same 3D object from two different points of view. The relationship between one camera and one projector unit may similarly be described by epipolar geometry. In the following example, the images are obtained using two or more cameras, wherein each camera has a predefined fixed position relative to the other and to the one or more projector units of the scanning device. The example can be generalized to more cameras and more projector units. Each camera is configured to capture a 2D image of the 3D object. This conversion from 3D to 2D is referred to as a perspective projection. This projection operation can be modelled by rays that emanate from the camera, passing through its focal center, also referred to herein as camera rays. Each emanating ray corresponds to a single point in the image of that camera.

As an example, to associate a given image feature with a pattern feature, a camera ray emanating from a first camera passing through its focal center and the image feature in the image plane of that camera is considered. This camera ray will appear as a point in the image plane of the first camera. However, the projector unit (or a second camera) will see the ray emanating from the first camera as a line/curve in the projector plane (in a realistic scenario where lens distortion is present, the line will not be a straight line), since the projector unit and camera views the object from two different views. The projected line/curve may also be referred to as an epipolar line. Accordingly, when camera rays associated with image features are projected onto the image plane of other cameras or onto projector planes, said rays form curves in those planes, and those curves are referred to herein as epipolar lines. It should be noted that only in the ideal case (i.e. with no lens distortion present) are the epipolar lines straight lines. In general, when a 3D line, such as a camera ray or a projector ray, is projected onto a plane, said line forms a curve in the plane. The action of (virtually) projecting a camera ray, said camera ray passing through the image feature and the focal center of the camera which acquired the image, onto the projector plane, whereby an epipolar line is obtained, may simply be referred to herein as projecting an image feature onto the projector plane or simply projecting image feature(s).

Each image feature in each image gives rise to an epipolar line in the projector plane when it is projected onto this plane. In accordance with preferred embodiments, the method comprises the step of associating, for each pattern feature in the projector plane, a number of image features among the determined image features, wherein the association of image features to pattern features comprises the steps of:

- projecting, for each image, each of the determined image features onto the projector plane whereby an epipolar line is obtained for each projected image feature; and
- associating, for each pattern feature, any image features whose corresponding epipolar line passes within a predetermined distance to a pattern feature.

The above method is exemplified for a scanning device comprising at least one projector unit and one or more cameras. However, the method may equally well be extended to scanning devices comprising two or more scan units, wherein each scan unit comprises a projector unit and one or more cameras, such as two or more cameras. Accordingly, the method may comprise the step of associating, for each pattern feature in each projector plane, a number of image features among the determined image features. The distance between a given pattern feature and a given epipolar line may be defined as the shortest distance from the pattern feature to any point on the epipolar line. This distance may be calculated using known methods. The method may specify a predetermined distance, such as a 2D distance, setting a threshold for when epipolar lines are close enough to be associated with a given pattern feature. Any epipolar lines, wherein the shortest distance from the line to the pattern feature exceeds the predetermined distance are then not associated with that particular pattern feature. For some pattern features it may not be possible to associate any image features, i.e. in that case zero image features are associated. This may be the case e.g. if the projector ray corresponding to a given pattern feature does not hit the 3D object at all.

The aforementioned approach of associating image features to pattern features is based on projective geometry. Such an approach ideally assumes no lens distortion. In reality, lens distortion, in particular large values of lens distortion, in the optical system means that 3D lines in space do not form straight lines when projected onto a plane. Traditionally, epipolar lines in epipolar geometry refer to straight lines in an image plane or projector plane. However, in this context, an epipolar line simply refers to a line in 3D which is projected onto a 2D plane, thereby forming a curve. In case lens distortion is present in the optical system (e.g. the scanning device), such a curve will not be a straight line. A number of known mathematical models exist, which can correct for both radial distortion and for tangential distortion caused by physical elements in a lens not being perfectly aligned. An example of such a mathematical model is the Brown-Conrady model, which may be implemented to correct for distortion or to model the distortion.

At this point, a neighborhood graph comprising information of the image features (position and other properties such as phase) has preferably been generated for each of the acquired images. Accordingly, each neighborhood graph stores information of the image features, such as the 2D position of each determined image feature along with the predefined property. Furthermore, each pattern feature has been associated with a number of image features. Preferably, the next step of the disclosed method is to determine (and assign) the possible depth(s) of the determined image features in the acquired images.

Determining Depths of Image Features

In the following, an example of how to determine the depths using a triangulation method is given. Each pattern feature in the projector plane may be projected in 3D by emanating a projector ray from the projector through the pattern feature. This is analogous to emanating camera rays from the cameras through the image features, as previously explained. Similarly, a camera ray may be projected in 3D for each image feature, wherein the camera ray emanates from the camera of that particular image feature. It should be noted that these projections are performed virtually by a processor implementing or executing the described method. In other words, for each pattern feature, a projector ray is considered in 3D along with the camera rays of the associated image features. Theoretically, the camera rays should intersect each other perfectly at unique 3D points. However, in the real world the camera rays do not intersect precisely through a given 3D point, due to e.g. geometric distortions or blurring of unfocused objects caused by lenses and finite sized apertures. Therefore, it is more relevant to determine 3D points where the camera rays and projector ray cross each other within a predefined distance or tolerance. If multiple camera rays intersect a given projector ray within the predefined distance and at similar depths, this is equivalent to the cameras 'agreeing' on a particular image feature, i.e. this image feature appears in both/all images and the intersection may be used to assign a depth to the image feature. This method step is repeated for all pattern features, i.e. all projector rays are considered along with camera rays of the associated image features, whereby one or more depth(s) may be assigned to each image feature. Accordingly, several depths may be assigned to each image feature, e.g. one depth for each projector ray that the camera ray corresponding to that image feature passes close to. Here, the term 'close to' may be understood as intersecting within a predefined distance as explained above. It should be noted that the depths are measured along each projector ray, i.e. from the projector location to the intersections described previously.

As an example, a scanning device comprising a projector unit and four cameras is considered. In this example, at least one image is acquired by each camera, whereby at least four images are acquired. A neighborhood graph may be generated for each image and the image features may be associated to pattern features as previously explained. Then, for each pattern feature in the projector plane, a projector ray is projected in 3D together with up to four camera rays, one from each camera, wherein each camera ray pass through an image feature associated with the considered projector ray. All intersections (3D points), wherein the camera rays intersect a given projector ray within the predefined distance, are then determined, whereby potentially one or more depths may be assigned to the image features for the projector ray. In some cases, no depth can be assigned to an image feature for the considered projector ray. The method may further comprise the step of ordering the determined image features according to depth. The image features may be stored in a list, wherein the list is sorted according to image feature depth. Such a list may be generated for each pattern feature/projector ray.

In accordance with some embodiments of the method, the step of determining one or more depths associated with each image feature comprises the steps of:

- projecting, for each camera, a camera ray for each of the image features in the acquired images, wherein each camera ray is projected in 3D;
- projecting a projector ray for each pattern feature, wherein each projector ray is projected in 3D;
- determining points in 3D, wherein the camera rays associated with image features of different camera index intersect the projector ray within a predefined distance, wherein each of the determined points corresponds to a depth;
- assigning the depth(s) to each image feature; and
- optionally ordering the image features associated to each pattern feature according to depth.

Generating Image Feature Groups

As a next step, the image features are preferably grouped in image feature groups. Accordingly, the method may comprise the step of generating image feature groups, wherein each image feature group comprises one or more image features. Preferably, the image features within an image feature group each has a unique camera index.

In the following, an example of how to generate image feature groups is provided. In this example, the method further comprises the step of ordering the determined image features (for each pattern feature) according to depth prior to the generation of image feature groups. Then, the image feature groups may be generated using a sliding window approach, wherein a sliding window of a predetermined size is used to group image features, wherein image features within an image feature group each has a unique camera index. Accordingly, the sliding window may be applied to the list of image features sorted according to depth, wherein each instance of a group of image features is stored, said group having an amount of image features corresponding to the predetermined size of the window, wherein each image feature within the group has a unique camera index. Each time an image feature group is generated/stored, the image features of that particular group are preferably marked to keep track of used features, i.e. image features already forming part of a group. Image features within the same group are corresponding image features obtained from different images. Therefore, image features within an image feature group are expected to have approximately the same depth.

In general, the number of cameras of the scanning device may be denoted N. In some embodiments of the disclosed method, a sliding window of size Nis applied to the list of image features. As an example, the images may be acquired by a scanning device having four cameras, which corresponds to N=4. In that case, the sliding window will similarly have a size of 4, such that image feature groups with four image features in each group are generated. In some embodiments, the image feature groups are generated using an iterative process, wherein the size of the sliding window is changed iteratively from an initial size of Nto a final size smaller than N. In each iteration, the size of the sliding window may be decreased by 1 until a predefined size, such as 1, is reached. In the above example of N=4, the initial size of the sliding window would be 4. Then, in a subsequent iteration of generating image feature groups, the sliding window would be 3, etc. In the last iteration, the sliding window may be a predefined size smaller than N. In some cases this may even be 1, i.e. meaning that each image feature group only comprises one image feature. The above described method is useful for grouping image features having approximately the same depth. The sliding window approach may be done for each pattern feature, i.e. for each projector ray.

The generation of Image feature groups may comprise the step of determining the standard deviation of the depths of the image features within each image feature group. The standard deviation may be assigned to each image feature group. Furthermore, a depth may be assigned to each image feature group, thus giving rise to a potential 3D point by projecting the projector ray out to that depth. This depth may be an average of the depths of the image features within the image feature group. Alternatively, the assigned depth may be chosen such that the sum of square of distances between the image features and the projection of the 3D point to the image planes, wherein said image features reside, is the smallest possible. Additionally, a number corresponding to the size of the sliding window used to generate the group, may be assigned to each group. Finally, a reliability score may be assigned to each image feature group, wherein the reliability score indicates how reliable the image feature group is considered. The reliability score preferably indicates how close the projector and camera rays pass to each other, wherein a high reliability score indicates that the camera rays pass very close to a given projector ray. The standard deviation and/or the size of the sliding window may be used to indicate how reliable that particular image feature group is considered. Alternatively, the sum of square of distances may be employed to assign a reliability score to the image feature group. As an example, image feature groups having four image features are generally considered more reliable than groups having only two image features. Accordingly, the standard deviation and/or the size of the sliding window may be used to determine the reliability score of each image feature group. Other parameters forming part of the reliability score may be envisioned. The image feature groups may be stored in a list. In some embodiments, the list of image feature groups is sorted according to the standard deviation and/or the reliability score of the groups.

The determined Image feature groups should not be considered as the final solution to the correspondence problem. Rather, the groups (or list of groups) may be considered as candidates to a solution to the problem, wherein some candidates are considered more promising (i.e. more likely to be the true, ideal solution) than other, which is reflected by their reliability score. The most promising image feature group, i.e. the group having the highest reliability score is also denoted herein as a pre-seed, provided the group comprises N image features, where N denotes the number of cameras in the scanning device used to obtain the images. A high reliability score corresponds to a low standard deviation of the depths in the group, i.e. the image features in the group have approximately the same depth. A high reliability score also corresponds to a size of the sliding window of N. Accordingly, the reliability score may be an aggregate score formed by taking any of the following measures into account: the standard deviation, the sum of square of distances, the size of the sliding window, and/or combinations thereof, or other suitable measures. The image feature groups may be sorted lexicographically, i.e. such that all N-cam groups (image feature groups comprising N image features) are sorted according to reliability score, the (N−1)-cam groups are similarly sorted, and so on. There can only be one pre-seed for each pattern feature/projector ray, however, it may also be the case that there is no pre-seed determined for a given pattern feature. This may be the case if some image features are only verified by n cameras, where n is less than the total number of cameras, N.

Generating Seed Proposals

In accordance with preferred embodiments, the method comprises the step of generating one or more seed proposals. Each seed proposal preferably comprises at least a predefined number of image feature groups, such as at least 10 image feature groups, or at least 15 image feature groups, or at least 20 image feature groups. In some embodiments, the predefined number of image feature groups in a seed proposal is 15, such that each seed proposal comprises at least 15 image feature groups.

A seed proposal may be understood as a collection of image feature groups, wherein each image feature group comprises at least one image feature. At least one attribute of an image feature group may be a point in 3D space, e.g. described by a set of Cartesian coordinates (x, y, z), wherein z denotes the aforementioned depth assigned to the image feature group. The image feature groups may preferably comprise more attributes such as: projector ray index, and/or the indices of the individual image features within the group. The projector ray index may be understood as an index denoting which projector ray is associated to the image feature group. In more general terms, a seed proposal may be understood to be a set of data points in space, such as a point cloud. The presently disclosed method provides a framework for generating a digital representation of a 3D object by continuously generating and adding seed proposals to the representation (initially, i.e. before any seed proposal (s) are added, the representation may be empty).

To generate a seed proposal, one or more image feature groups are added incrementally to the proposal, preferably starting from a pre-seed. In preferred embodiments of the method, only image feature groups meeting one or more predefined first criteria are added to the proposal.

The step of adding a feature group to a seed proposal may comprise a check relating the neighborhood information on the image feature level to the neighborhood information on the pattern feature level. More precisely, if a feature group corresponding to a given pattern feature has already been added to the seed proposal, when considering whether to add a feature group corresponding to a neighboring pattern feature, the image features of the candidate image feature group should be the corresponding neighbors of the given image feature group in the neighborhood graph. In other words, if the candidate image feature group is the neighbor of the original image feature group with a given index, the image features in the original image feature group should have the features of the candidate image feature group as their neighbors with that index.

As an example, the one or more predefined first criteria may comprise a criterium that the standard deviation of a given image feature group has to be below a predefined threshold in order for the image feature group to be added to the seed proposal. As another example, the predefined first criteria may comprise a check similar to the one described in the foregoing paragraph. As yet another example, the reliability score of a given image feature group must be above a predefined value in order for the group to be added. Preferably, the image feature groups are added to the seed proposal(s) in prioritized order according to their reliability score provided the one or more predefined first criteria are met.

The following paragraph provides an example of how to generate a seed proposal. First, a pre-seed associated with a given pattern feature in the projector plane is added to a queue. The pre-seed may constitute the first image feature group (3D point) in the seed proposal. The pre-seed is generally surrounded by a plurality of neighboring image feature groups corresponding to the neighbors in the projector pattern, typically eight in the case of a checkerboard pattern. A neighboring image feature group is also referred to as a 'neighbor' in the following. The number of neighbors may be lower near the edges of the image(s) or in regions where the projected illumination pattern does not hit the surface of the 3D object. As a next step, a feature group may be taken out of the queue and added to the seed proposal. Once a feature group is removed from the queue, all of its neighbors are preferably evaluated to determine whether any of them should be added to the queue. The process of taking one image feature group out of the queue and possibly adding one or more new image feature groups to the queue may be performed iteratively until the queue is empty.

The purpose of the evaluation is to assess whether a given image feature group (e.g. a neighbor to the pre-seed) should be added to the queue or not. For each neighbor, it may be determined if the reliability score exceeds a certain predefined threshold. If it does it is preferably added to the queue. If not, the next neighbor is preferably considered. It may also be determined whether the image feature group under evaluation has the correct property, e.g. the correct phase. Furthermore, it may be checked whether all the image features of a given image feature group have the correct neighbors in each of their associated neighborhood graphs. Image feature groups are preferably added to the queue as long as the one or more predefined first criteria are met. Preferably, the image feature groups are taken out of the queue in prioritized order according to their reliability score, such that the most reliable image feature groups are evaluated before less reliable image feature groups.

Hence, the queue preferably constitutes a priority queue, wherein the reliability score is the priority. In the case of a checkerboard pattern, a maximum of eight image feature groups (the number of neighbors for a given image feature) can be added to the queue per considered pre-seed/projector ray. However, preferably only one image feature group can be taken out of the queue in a single step. Accordingly, image feature groups are removed from the queue and added to a given seed proposal in a prioritized order.

Once the queue is empty, it is evaluated whether the seed proposal comprises at least a predefined number of image feature groups. The seed proposal may comprise more groups than the predefined number, however, in preferred embodiments it needs to comprise at least the predefined number. If the seed proposal comprises less image feature groups than this number, the seed proposal is preferably rejected, and the image feature groups may then form part of other seed proposals. If the seed proposal comprises at least the predefined number, the seed proposal is accepted. Preferably, the image feature groups forming part of the stored seed proposal are marked as used. The outlined approach may then be repeated for all projector rays, whereby potentially a plurality of seed proposals are generated. The plurality of seed proposals may also be referred to as a collection of seed proposals. Previously processed/evaluated projector rays are preferably marked such that in subsequent step(s), such marked projector rays do not need to be re-evaluated. It should be noted that the above described method of generating a seed proposal is preferably repeated using a different set of criteria in one or more subsequent passes. Said different set of criteria is preferably less stringent than the first set of criteria. As an example, the size, n, of each image feature group (i.e. the amount of image features inside a group) may be less than N in such a second pass of the generation of seed proposals, where N denotes the number of cameras. Hence, the method of generating seed proposals may be repeated iteratively, where n is decreased iteratively by 1 between each iteration. In the subsequent passes, accepted seed proposals may be allowed to merge with each other and/or new seed proposal(s) may be allowed to merge with accepted seed proposal(s). It may further be allowed to grow accepted seed proposals under more relaxed criteria. The term 'grow' may be understood as increasing the number of image feature groups in a given seed proposal.

Accordingly, the method may comprise the step of generating one or more seed proposals, wherein the generation of each seed proposal comprises the steps of:

i. adding one or more image feature groups to a seed proposal based on one or more predefined first criteria; and ii. accepting seed proposal(s) comprising at least the predefined number of image feature groups.

Generating the Digital Representation

A final step of the disclosed method is to generate a digital representation of the 3D object by adding one or more seed proposal(s) to the digital representation. In preferred embodiments, the seed proposal(s) are added based on one or more predefined second criteria. In some embodiments, the second criteria comprise a criterium that the seed proposal should comprise at least a predefined amount of image features, which are not marked, in order for the seed proposal to be added to the digital representation.

The digital representation may initially be empty, i.e. without comprising any information. The digital representation may then be built by adding one or more seed proposals from the collection of seed proposals previously generated to the (initially empty) representation. Preferably, seed proposals comprising the highest number of image feature groups are considered/added before seed proposals comprising less image feature groups. Accordingly, the seed proposal(s) may be added to the digital representation in prioritized order according to the amount of image feature groups in each seed proposal. Preferably, once a seed proposal has been added to the representation, its image feature groups are marked as in use. Preferably, subsequently considered seed proposals comprise no marked image feature groups. However, in some embodiments, there may be an overlap of image feature groups, such that some image feature groups belong to more than one seed proposal. Therefore, in some embodiments, each seed proposal should comprise at least a predefined amount of image features, which are not marked, in order for the seed proposal to be added to the digital representation. As soon as at least one seed proposal is added, e.g. to an initial empty representation or to a pre-seed, the digital representation is generated. Subsequently, further seed proposals may be added to the representation, whereby the amount of data (image feature groups) forming part of the representation is increased. The digital representation may be provided in the form of one or more point clouds.

DETAILED DESCRIPTION OF DRAWINGS

Figure 1:
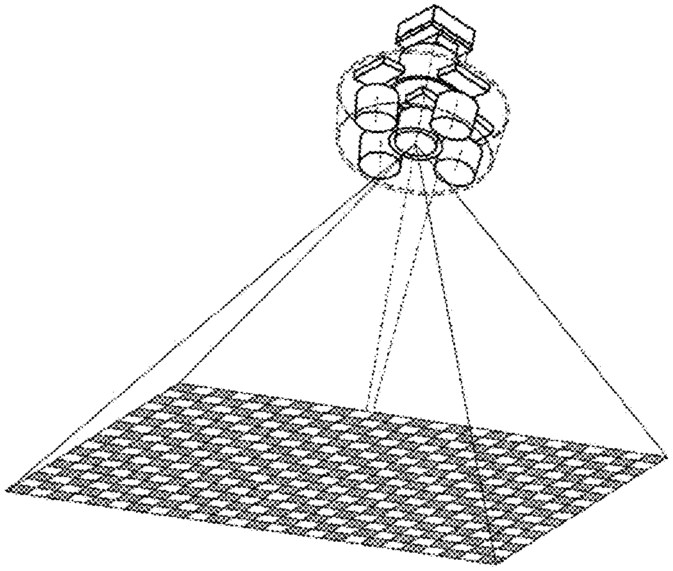
FIG. 1 shows a perspective view of a scan unit comprising a projector unit and four cameras, wherein the projector unit is configured for projecting a light pattern.

FIG. 1 shows a perspective view of a scan unit comprising a projector unit and four cameras, wherein the projector unit is configured for projecting a light pattern (here a checkerboard pattern) onto a surface of an object. The light pattern may be a static pattern in time. The pattern of light may be a high-density pattern as described herein.

Figure 2:
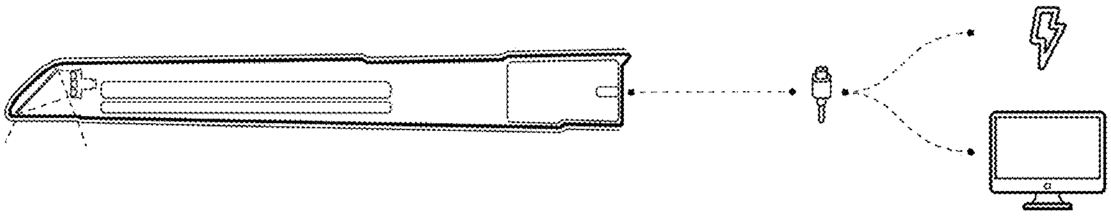
FIG. 2 shows an embodiment of a scanning device comprising a scan unit, said scan unit comprising a reflecting element, here exemplified as a mirror.

FIG. 2 shows an embodiment of a scanning device comprising a scan unit, said scan unit comprising a reflecting element, here exemplified as a mirror. In this embodiment, the scanning device is configured to transfer scan data using a wired connection, such as a USB cable or ethernet cable. Furthermore, the scanning device may be powered by a wired connection to a power supply. The scanning device may transfer data to a computer system comprising a display for displaying a 3D representation of the dental object.

FIG. 3 shows an embodiment of a scan unit according to the present disclosure. In this embodiment, the scan unit comprises a projector unit and four cameras, wherein the projector unit is arranged in the center of the scan unit, with the four cameras symmetrically arranged around the projector unit. The scan unit further may further comprise a fixation unit configured for mounting the projector unit and the camera(s) in the scan unit.

FIG. 4 shows a cross-section through a scanning device according to the present disclosure. In this embodiment, the scanning device comprises two scan units arranged in series along a longitudinal axis of the scanning device in order to increase the field of view of the scanning device. Having a larger field of view enables large smooth features, such as the overall curve of a given tooth, to appear in each image, which improves the accuracy of a subsequent stitching of respective 3D scan data, such as 3D surfaces, obtained from different sets of images. Each scan unit is arranged in combination with a reflecting element, such as a mirror, wherein the reflecting element is configured to alter the direction of light projected by a given scan unit. The scanning device may further comprise a housing for accommodating the scan units and the frame. The housing may comprise an optical window arranged in a distal end of the scanning device. The optical window may be made of a polymer, such as poly(methyl methacrylate) (PMMA), or it may be made of a glass, such as sapphire glass.

FIG. 5 shows a flowchart of an embodiment of the presently disclosed method. The first step 101 of the method is to receive or acquire images of a three-dimensional (3D) object. The images may be acquired/provided by a scanning device such as an intraoral 3D scanning device. The images may be acquired by projecting a predefined pattern onto a surface of the 3D object, wherein the pattern comprises a plurality of pattern features, such as corners in a checkerboard pattern. The acquired images will similarly comprise a plurality of image features. In step 102, said image features are determined. The image features may be determined automatically by a neural network trained to determine the image features. The neural network may be further configured to output further properties of the pattern, such as a phase associated with each image feature. In step 103, the depth(s) of each image feature are determined using triangulation. As an example, in case an image feature is associated with five pattern features, i.e. in case the camera ray corresponding to said image feature intersects five different projector rays within a predefined tolerance, then five possible depths are assigned to that image feature. Each depth is measured along a projector ray from the projector plane to the intersection. In step 104, image feature groups (3D points) are generated by grouping image features in groups having a predetermined size, wherein each image feature within a group has a unique camera index. In other words, image features within such a group originates from different images acquired by different cameras. The image feature groups are preferably generated in an iterative approach, wherein a sliding window is applied to the ordered list of image features. The size of the sliding window may be decreased between each iteration, such that the size of the generated image feature groups similarly decreases between each iteration. Furthermore, a reliability score may be assigned to each image feature group. The reliability score is a measure of how close the camera rays of the image features within the group passes to the projector ray associated with that image feature group. In step 105, seed proposal(s) are generated. A seed proposal is a collection of image feature groups. When generating a seed proposal, it is evaluated whether a given image feature group should be added to a queue or not based on predefined criteria. The queue is a priority queue, wherein the priority is the reliability score. As a starting point, a pre-seed is added to the queue and then the neighboring image feature points to that pre-seed is evaluated. Any neighbors fulfilling the predefined criteria are then added to the queue. In general, many image feature groups may be added to the queue, but preferably only one may be removed from the queue at a given instance. Once image feature groups are added to the queue, the image feature group having the highest priority, i.e. highest reliability score, is removed from the queue and added to the seed proposal. The neighbors of the image feature group which was most recently removed from the queue are then evaluated and possibly added to the queue. This may then continue until the queue is empty. In general, the image feature groups are taken out of the queue one by one according to their priority/reliability score. However, each time an image feature group is removed from the queue and added to the seed proposal, the neighbors of that image feature group is evaluated according to the criteria, and possibly added to the queue. Once the queue is empty, it is evaluated whether the number of image feature groups in the seed proposal exceeds a predefined lower limit. In case the seed proposal comprises at least this minimum amount of image feature groups, the seed proposal is stored. More seed proposals may be generated according to the outlined procedure, and some of the predefined criteria may be relaxed in subsequent generations of seed proposals. Thereby, collections of seed proposals may be generated and stored. In step 106, a digital representation is generated based on the seed proposal(s). The digital representation may be generated by adding seed proposal(s) to an initially empty representation. Preferably, the seed proposals are added to the representation in a prioritized order according to the size of the seed proposal, i.e. according to the number of image feature groups within a seed proposal. Each seed proposal comprises a set of 3D points in space. Consequently, the digital representation similarly comprises a set of 3D points, such as in the form of a point cloud. In subsequent method steps, a 3D surface model may be constructed based on the point cloud.

FIG. 6 shows a flowchart of an embodiment of the presently disclosed method. The steps 201-203 are similar to the steps 101-103 described in relation to FIG. 5. In this embodiment, the method further comprises a step 204, wherein the image features within a given projector ray, i.e. all the image features associated to a given pattern feature, are ordered according to depth. This may be done for all pattern features, whereby an ordered list of image features is generated for each pattern feature. Steps 205-207 are similar to the steps 104-106 described in relation to FIG. 5.

FIG. 7 shows a flowchart of an embodiment of the presently disclosed method. The steps 301-302 are similar to the steps 101-102 described in relation to FIG. 5. In this embodiment, the method further comprises a step 303, wherein a neighborhood graph is generated for each image based on the image features and the phases. The neighborhood graph may be provided as a 2D map displaying information such as the position(s) of the image features, the connectivity of the image features (i.e. the relations between the image features), the phase of the image features, or combinations thereof. The method further comprises a step 304, wherein image features are associated with pattern features or vice versa. This may be achieved by projecting lines in 3D (projector rays, camera rays) onto 2D planes (image planes, projector planes), whereby curves are obtained. As an example, for a given projector ray (line in 3D) projected to an image plane, at each instance that the projected ray passes close to an image feature in that image plane, e.g. within a predetermined distance, the pattern feature corresponding to said projector ray is associated with said image feature. Conversely, for a given camera ray (line in 3D) projected to a projector plane, at each instance wherein said projected camera ray passes close to a pattern feature, the image feature corresponding to said camera ray is associated with said pattern feature. It is thereby possible to associate each image feature with a number of different pattern features/projector rays. Accordingly, several depths may be assigned to the same image feature. Step 305 is similar to step 103 described in relation to FIG. 5. Step 306 is similar to step 204 described in relation to FIG. 6. Steps 307-308 are similar to the steps 104-106 described in relation to FIG. 5.

FIG. 8 shows a flowchart illustrating how to determine the possible depths of a given image feature according to the disclosed method. In step 401, a camera ray corresponding to the image feature is projected in 3D, i.e. emanating from said image feature. In step 402, a projector ray is projected in 3D for each pattern feature, such that each projector ray emanates from a pattern feature. In step 403, points in 3D are determined, wherein the camera ray and the projector ray(s) intersect within a predefined distance. In step 404, the depth of each intersection is determined by measuring the distance from the projector plane along each of the projector rays intersecting the camera ray. In step 405, the depth(s) are assigned to the image feature. Accordingly, several depths may be assigned to an image feature (one for each intersection). It should be noted that at this point/step in the method, the correspondence problem is not solved yet. Therefore, it is not known which of the assigned depths is the true solution to the correspondence problem. The steps 401-405 may be repeated for all image features in all images.

FIG. 9 shows a flowchart illustrating how to generate image feature groups according to the disclosed method. In step 501, the image features associated with a given pattern feature are ordered/sorted according to depth. It should be noted that within a given projector ray corresponding to a pattern feature, each image feature can only have one depth. The reason why an image feature may have several depths assigned, is that the image feature can be assigned to several different pattern features. Therefore, there is no ambiguity when ordering the image features associated with a given pattern feature according to depth. Then in step 502, a sliding window technique is employed to look through the ordered list of image features within a given projector ray/pattern feature. The sliding window has a predefined first size, n. In step 503, it is evaluated whether there are n image features from n different cameras within the sliding window. If this is the case, an image feature group is generated comprising said n image features. In step 505, the standard deviation of the depths within the image feature group is determined. In step 506, a reliability score is assigned to the image feature group. The standard deviation and/or the size of the sliding window may be used to determine the reliability score. However, other parameters to determine the score may be envisioned. In general, the reliability score should reflect how likely it is that the given image feature group (3D point) forms part of the correct solution to the correspondence problem. In step 507, the size of the sliding window is decreased by 1, such that it has a size of n−1. Then, steps 502-507 may be repeated until the sliding window reaches a predefined second size, such as 1. Hence, the image feature groups may be generated using an iterative approach, wherein the size of the sliding window is decreased by 1 in each iteration.

FIG. 10 shows a flowchart illustrating how to evaluate whether a given image feature group should be added to a priority queue. In step 601, it is evaluated whether the predefined property, such as the phase, of the image feature group is correct. If it has the wrong phase, the image feature group is ignored and then one of the neighboring image feature groups is considered in step 602. If the predefined property is correct, then in step 603 it is evaluated whether the image features within the group have the correct neighbors. This may be determined by consulting the neighborhood graph of each image feature. If this criterium is met, it may be evaluated whether the standard deviation of the image feature group is below a predefined threshold in step 604. If all the criteria (601, 603, 604) are met, the group may be added to the priority queue in step 605. After adding a group, the method may continue by evaluating a next neighbor until all neighbors of the given image feature group considered to begin with have been evaluated.

FIG. 11 shows a flowchart illustrating how image feature groups may be removed from the queue and added to a seed proposal. The priority queue may comprise many image feature groups, each having a reliability score. The group having the highest score is prioritized over groups having a lower score. In step 701, the image feature group having the highest reliability score is taken out of the queue and added to a seed proposal. In step 702, the neighbors of the image feature group, which was most recently removed from the queue, are evaluated. Preferably, only neighbors that have not previously been evaluated are evaluated in step 702. Step 702 may then comprise the steps 601-604 listed in relation to FIG. 10. In step 703, any image feature groups fulfilling the predefined first criteria are added to the queue. The method may in some embodiments further feature the steps 704-707. In step 704, it is evaluated whether the queue is empty. If this is not the case, step 701-704 may be repeated until the queue is empty. Once empty, it may be evaluated in step 705 whether the size of the seed proposal is sufficient, e.g. whether the number of image feature groups within the seed proposal equals or exceeds a predefined number. In step 706, the seed proposal may be rejected if the size is smaller than the predefined number. In step 707, the seed proposal may be accepted if the seed proposal comprises at least the predefined number of image feature groups.

FIG. 12 shows a flowchart illustrating how the digital representation may be generated based on seed proposals. In step 801, an initial digital representation is defined, which may be empty. In step 802, seed proposal(s) are considered in order according to their size, i.e. the number of image feature groups within the seed proposal. Accordingly, seed proposal(s) with many image feature groups are prioritized over seed proposal(s) having less. In step 803, it is evaluated whether any image feature groups of the seed proposal are currently part of the digital representation. If this is not the case, the seed proposal is added to the digital representation in step 804. In step 805, image feature groups belonging to recently added seed proposal(s) may be marked. It should be noted that the steps 801-805 only form an embodiment/example of how to generate the digital representation based on seed proposal(s). As another example, steps 803 and 805 are not necessarily performed, whereby the representation is generated by adding one or more seed proposal(s) in order according to their size. In yet another example, only steps 801 and 804 are performed, such that the representation is simply generated by adding the previously generated seed proposal(s).

FIG. 13 shows a schematic of a computer system. The computer system may comprise a central processing unit (CPU) 901, which is configured to read and execute instructions stored in a computer memory, which may take the form of volatile memory such as random-access memory (RAM) 902. The computer memory stores instructions for execution by the CPU and data used by those instructions. For example, the instructions may relate to the methods disclosed herein. The computer may further comprise non-volatile storage, e.g. in the form of a hard disk 906. The computer further comprises an I/O interface 904 to which other devices may be connected. Such devices may include display(s) 907, keyboard(s) 908, and pointing device(s) 909 e.g. a mouse. The display 907 may be configured to display a 2D rendition of the digital representation of the dental object. A user may interact with the computer system via a keyboard 908 and/or a mouse 909. A network interface 905 allows the computer system to be connected to an appropriate computer network so as to receive and transmit data from and to other computing devices. The CPU, computer memory (RAM/ROM), hard disk, I/O interface, and network interface may be connected by a bus.

FIG. 14 shows an embodiment of a dental scanning system according to the present disclosure. The dental scanning system may comprise a scanning device 1001, such as an intraoral 3D scanning device. The system may further comprise a computer system 1003 as described in relation to FIG. 13. The scanning device 1001 may provide scan data 1002, such as images or point clouds, to the computer system 1003, which may be configured to generate a digital 3D surface model based on the scan data. The scanning device may comprise one or more projector units configured for projecting a predefined pattern onto the 3D object, wherein each projector unit is associated with a projector plane; and one or more cameras for each projector unit, wherein each camera is configured for acquiring images of at least a part of the 3D object. The scanning device may further comprise one or more processors configured for carrying out any of the methods disclosed herein. In some embodiments, the dental scanning system only comprises the scanning device 1001.

FIG. 15 shows a rendered image of a 3D object, here some teeth of a subject. An illumination pattern (here a checkerboard pattern) is visible in the image. Such an image is an example of a suitable image to be used as training input to the neural network described herein.

FIG. 16 shows an example of an output from the neural network. The output is here a checkerboard pattern, wherein a plurality of checkers (black/white) have been identified by the neural network and classified as either black or white.

FIG. 17-18 show two maps of image features represented as points, wherein the image features correspond to corners in the checkerboard pattern shown in FIG. 16. In FIG. 17 the image features are of the type BW (Black-White-White-Black), whereas they are of the type WB (White-Black- Black-White) in FIG. 18. The two maps may be provided as an output from the neural network.

FIG. 19 shows another example of an output from the neural network. Here, the neural network has outputted an image displaying some boundaries identified by the network.

FIG. 20 shows an example of a static light pattern, wherein the pattern is a checkerboard pattern comprising a plurality of alternating checkers of black and white. In this example, the checkerboard pattern is projected by a projector with focal length 0.7 mm and checkers of size 7 μm. At a distance of 15 mm to the projector, a window of size 20 mm by 20 mm will contain a grid of 140×140 of such checkers. It is assumed that the radius of the aperture in the projector is 0.1 mm—this determines the degree of diffraction of the pattern. It is further assumed that the noise of the sensor used for measuring the pattern in this scenario is purely shot noise and that the magnitude is 1% at peak value. The resulting sensor signal is illustrated in FIG. 20.

FIG. 21 shows a measured intensity signal of the checkerboard pattern shown in FIG. 20. The total density measure can be computed by summing the intensity values in the image and multiplying with the area of each pixel, in this case giving a value of approximately 36993. A mathematical expression of the total density measure is given elsewhere in the description. Thus, in case of a projected pattern similar to the one of FIG. 20, the integral $$\int_A \left(\frac{\partial I}{\partial x}(x, y)\right)^2 + \left(\frac{\partial I}{\partial y}(x, y)\right)^2 dA$$

gives a value of 36993.

FIG. 22 shows an example of a random pattern of black and white squares. It is assumed that the radius of the aperture in the projector is 0.1 mm—this determines the degree of diffraction of the pattern. It is further assumed that the noise of the sensor used for measuring the pattern in this scenario is purely shot noise and that the magnitude is 1% at peak value. The resulting sensor signal is illustrated in FIG. 23.

FIG. 23 shows a measured intensity signal of the random pattern shown in FIG. 22. The density measure, i.e. the aforementioned integral, can be computed by summing the intensity values of the above image and multiplying with the area of each pixel, in this case giving a density measure of the signal in FIG. 22 of approx. 24342, i.e. a significantly lower density measure than the checkerboard pattern.

FIG. 24 shows an example of a polygonal pattern composed of checkers, thus forming a checkerboard pattern, each checker/square comprising four edges and four corners. This example of a checkerboard pattern comprises 6×6 checkers, thus a total of 36 checkers. However, in preferred embodiments wherein the light pattern is a checkerboard pattern, the checkerboard pattern may comprise many checkers such as at least 100×100 checkers.

FIG. 25 shows an example of a repeating unit for the pattern shown in FIG. 24. Other examples of repeating units could be given. For this example, the repeating unit shown is repeated three times horizontally and three times vertically to form the pattern of FIG. 24.

FIG. 26 shows an example of a checkerboard pattern, wherein pattern features are indicated on the figure as circles, said features corresponding to the inner corners in the pattern. The pattern features may correspond to all of the corners in the pattern, or they may correspond to the inner corners in the pattern as indicated in this figure.

FIG. 27 shows an example of a checkerboard pattern, wherein pattern features are indicated as circles, said features corresponding to the corners in the pattern, wherein corners located on the outer boundary of the pattern are included. In general, as the checkerboard pattern is expanded with more checkers, the difference between the number of inner corners and the number of total corners including those at the boundary will diminish.

FIG. 28 shows an example of a polygonal pattern composed of triangles, each triangle comprising three edges and three corners.

FIG. 29 shows an example of a repeating unit for the pattern shown in FIG. 28.

FIG. 30 shows an example of a polygonal pattern composed of triangles, wherein pattern features are indicated as circles, said features corresponding to the corners in the pattern.

FIG. 31 shows an example of a repeating unit for the pattern shown in FIG. 30, wherein one of the edges have been highlighted.

FIG. 32 shows an example of a polygonal pattern composed of hexagons, each hexagon comprising six edges and six corners.

FIG. 33 shows the pattern of FIG. 32, wherein a repeating unit 1 has been indicated, along with some of the pattern features 2 and edges 3 of the pattern.

FIG. 34 shows an example of a polygonal pattern composed of triangles, each triangle comprising three edges and three corners.

FIG. 35 shows an example of a pattern with fiducial markers (here exemplified as a cross). In this example, the pattern is a checkerboard pattern, wherein some of the originally white squares have been replaced by a dark square, thereby creating a plurality of fiducial markers.

FIG. 36 shows an example of a pattern with fiducial markers (here exemplified as a cross). This example is largely similar to that of FIG. 35, except there is a greater spacing between the fiducial markers.

FIG. 37 shows an example of a pattern with fiducial markers (here exemplified as a cross). This example is largely similar to that of FIG. 35, except some of the originally dark squares have been replaced by a white square, thereby creating a plurality of fiducial markers.

Examples

The following will provide an example of how the neural network can be trained to determine image features. As input, the network may be given an image of a scene illuminated with a given pattern with 3 color channels, i.e. a WxHx3 tensor with W being the width of the image and H the height of the image. As training input, the neural network may be given a rendering of a 3D object, such as a dental object. A suitable image for training purposes is illustrated in FIG. 14. The objective is for the neural network to deliver one or more types of data as output. Examples are given below:

- a channel containing the likelihood that the pixel is in a part of the pattern with phase 0 (corresponding to a black checker);
- a channel containing the likelihood that the pixel is in p part of the pattern with phase 1 (corresponding to a white pixel);

a channel containing the likelihood that the pixel is in the background such that no pattern is visible in the pixel (marked as grey in the output image);

a channel containing the likelihood that the pixel is part of an image feature of type BW (Black-White-White-Black);

a channel containing the likelihood that the pixel is part of an image feature of type WB (White-Black-Black-White);

a channel containing the likelihood that the pixel is not part of a feature; and a channel containing the likelihood that the pixel corresponds to a depth discontinuity (i.e., adjacent pixels have drastically different depths).

The neural network may be trained using supervised learning with a large number of input-output pairs, where an input-output pair is understood to be the aforementioned image (WxHx3 tensor) and at least one of the desired types of output data. Preferably, all 7 types of output data are used in each input-output pair during the supervised learning. As an example, a training set may comprise 15000 of such input-output pairs, but larger sets are likely to increase the performance and reliability of the network.

As training data one can use rendered images of the 3D object, such as teeth. FIG. 14 shows an example of a suitable image for training purposes. The following data may be used to generate training data:

a reference 3D model of a jaw or part of a jaw;

a color map for the 3D model;

a trajectory that the scanning device moved along when capturing the reference scan;

one or more intrinsic parameters for the camera to be used to render the images;

one or more intrinsic parameters for the projector used to generate the pattern; and the relative positions of the cameras and the projector.

By using the above-mentioned training data as input, it is possible to generate ground truth (desired output data) and input data for each pose along the trajectory by ray-tracing. FIGS. 15-18 show different types of output data. FIG. 15 shows a checkerboard pattern projected onto teeth, wherein a plurality of checkers (black/white) have been identified by the neural network. FIG. 16-17 show two maps of image features represented as points, wherein the image features correspond to corners in the checkerboard pattern. In FIG. 16 the image features are of the type Black-White-White-Black, whereas they are of the type White-Black-Black-White in FIG. 17. FIG. 18 shows boundaries identified by the neural network.

An example of a suitable network architecture for the neural network is the Lite-HRNet architecture, as described in the article "Lite-HRNet: A Lightweight High-Resolution Network" by Changqian Yu et al. (accessible at https://arxiv.org/abs/2104.06403).

Further Details of the Invention

1. A 3D scanning system for scanning a dental object, comprising:
   an intraoral 3D scanning device comprising:
      at least one projector unit configured to project a light pattern on the dental object along a projector optical axis, the light pattern comprising a plurality of pattern features;
      one or more cameras having at least partly overlapping fields of view along different camera optical axes and along the projector optical axis, each of the cameras comprising an image sensor for acquiring one or more images, and
   one or more processors, wherein at least one processor is configured to generate a digital three-dimensional representation of the dental object based on triangulation between the cameras and the light pattern.
2. The 3D scanning system according to item 1, each of said camera optical axes defining an angle of at least 3 degrees with the projector optical axis.
3. The 3D scanning system according to any of the preceding items, wherein the light pattern is a polygonal pattern comprising a plurality of polygons.
4. The 3D scanning system according to any of the preceding items, wherein the pattern comprises at least 10000 pattern features and/or polygons.
5. The 3D scanning system according to any of the items 2-4, wherein the polygons are selected from the group of: triangles, rectangles, squares, pentagons, hexagons, and/or combinations thereof.
6. The 3D scanning system according to any of the items 2-5, wherein the polygons are composed of edges and corners, wherein the pattern features correspond to the corners in the pattern.
7. The 3D scanning system according to any of the items 2-6, wherein the polygons are repeated in the pattern in a predefined manner.
8. The 3D scanning system according to any of the items 2-7, wherein the pattern comprises a plurality of repeating units, wherein each repeating unit comprises a predefined number of polygons, wherein the repeating units are repeated throughout the pattern.
9. The 3D scanning system according to any of the preceding items, wherein the pattern is non-coded, such that no part of the pattern is unique.
10. The 3D scanning system according to any of the preceding items, wherein the pattern is coded, such that at least some parts of the pattern are unique.
11. The 3D scanning system according to any of the items 3-9, wherein the light pattern comprises at least 12000 polygons, preferably at least 15000 polygons, even more preferably at least 19000 polygons.
12. The 3D scanning system according to any of the preceding items, wherein the light pattern comprises at least 12000 pattern features, preferably at least 15000 pattern features, even more preferably at least 19000 pattern features.
13. The 3D scanning system according to any of the preceding items, wherein the light pattern is a checkerboard pattern comprising alternating squares of black and white.
14. The 3D scanning system according to any of the preceding items, wherein the light pattern is a checkerboard pattern comprising at least 100×100 squares of alternating black and white squares, such that the pattern comprises at least 9800 pattern features.
15. The 3D scanning system according to any of the preceding items, wherein the light pattern is a checkerboard pattern comprising at least 140×140 squares of alternating black and white squares, such that the pattern comprises at least 19000 pattern features.
16. The 3D scanning system according to any of the preceding items, wherein the pattern comprises a predefined number of fiducial markers.
17. The 3D scanning system according to item 16, wherein the pattern comprises at least one fiducial marker for every 20 pattern features, or for every 25 pattern features, or for every 50 pattern features, or for every 100 pattern features.

18. The 3D scanning system according to any of the items 16-17, wherein the geometry of the fiducial markers is selected from the group of: dots, triangles, rectangles, squares, pentagons, hexagons, and/or combinations thereof.

19. The 3D scanning system according to any of the items 16-18, wherein the fiducial markers resemble a cross.

20. The 3D scanning system according to any of the items 16-19, wherein the light pattern is a checkerboard pattern comprising alternating squares of black and white, and wherein the pattern comprises at least one fiducial marker for every squares in the checkerboard pattern.

21. The 3D scanning system according to any of the items 16-20, wherein one of the processor(s) of the scanning device is configured to identify the fiducial markers in the projected pattern.

22. The 3D scanning system according to item 21, wherein the processor is configured to identify the fiducial markers using a neural network.

23. The 3D scanning system according to item 23, wherein the processor is a neural processing unit (NPU).

24. The 3D scanning system according to any of the items 16-23, wherein the processor(s) of the scanning system is configured to solve a correspondence problem related to the fiducial markers initially, before solving a correspondence problem related to the pattern features/image features.

25. The 3D scanning system according to any of the items 16-24, wherein the one or more processors are further configured to:
identify one or more fiducial markers within at least one set of images among the acquired sets of images;
solve a correspondence problem related to the identified fiducial markers, wherein the correspondence problem is solved such that points in 3D space are determined based on the identified fiducial markers, wherein said points form a solution to the correspondence problem; and
calibrate the scanning device by adjusting one or more parameters of a mathematical geometry model associated with the scanning device, wherein the adjustment is based on the solution to the correspondence problem.

26. The 3D scanning system according to item 25, wherein the one or more parameters of the mathematical geometry model are selected from the group of: position of the camera(s), orientation of the camera(s), intrinsic parameters of the camera(s), and/or combinations thereof.

27. The 3D scanning system according to item 26, wherein the intrinsic parameters of the camera(s) are selected from the group of: focal length of the camera (s), offset of a lens in the camera(s), distortion of one or more lenses inside the scanning device, and/or combinations thereof.

28. The 3D scanning system according to any of the items 25-27, wherein the one or more processors are configured to perform the calibration in real-time during scanning of the dental object.

29. The 3D scanning system according to any of the items 25-28, wherein the step of calibrating the scanning device comprises the steps of:
mathematically projecting one or more camera rays and projector rays together in 3D space, said rays associated with the fiducial markers; and
minimizing the distance between the camera rays and a given associated projector ray by dynamically adjusting one or more parameters of the mathematical geometry model.

30. A 3D scanning system for scanning a dental object, comprising:
at least one projector unit configured to project a light pattern of a predefined density on the dental object along a projector optical axis;
one or more cameras, such as at least two cameras, having at least partly overlapping fields of view along different camera optical axes (and along the projector optical axis), each of said camera optical axes defining an angle of at least 3 degrees with the projector optical axis, each of the cameras comprising an image sensor having an array of pixels, and
one or more processors, wherein at least one processor is configured to generate a digital three-dimensional representation of the dental object based on triangulation between the cameras and the light pattern,
wherein the density of the projected light pattern is selected such that a density measure of the projected light pattern is above a predefined threshold.

31. The 3D scanning system of item 2, wherein a density measure of the projected light pattern in an area A on a plane surface is defined as $f_A$ 11112 dA, where $$||I||^2 = \left(\frac{\partial I}{\partial x}(x, y)\right)^2 + \left(\frac{\partial I}{\partial y}(x, y)\right)^2,$$

and where I=I(x, y), 0≤I(x, y)≤1, is an intensity signal measured in the area A.

32. The 3D scanning system of item 31, wherein the intensity signal is measured with a sensor with a predefined sensor noise with a magnitude of 1% at peak value.

33. The 3D scanning system of any of the preceding items 31-32, wherein the intensity signal is measured with a beam profiler.

34. The 3D scanning system of any of the preceding items 31-33, wherein the area A is between 100 and 5000 $mm^2$, preferably between 100 and 1000 $mm^2$, most preferably 20 mm×20 mm.

35. The 3D scanning system of any of the preceding items 31-34, wherein the distance from the tip of the probe to the plane surface is between 5 and 50 mm, preferably 15 mm.

36. The 3D scanning system of any of the preceding items 31-35, wherein the distance from tip of the probe to the plane surface is selected such that the projected light pattern is at least substantially in focus.

37. The 3D scanning system of any of the preceding items 31-36, wherein the density measure is at least 25000, preferably at least 30000, even more preferably at least 35000.

38. The 3D scanning system of any of the preceding items 31-37, wherein the light pattern comprises a predefined number of similar pattern features, such that the density measure scales with the number of similar pattern features in an area A on a plane surface.

39. The 3D scanning system of any of the preceding items, wherein the light pattern comprises a predefined number of similar pattern features.
40. The 3D scanning system of item 39, wherein the density measure is defined as the total number of similar pattern features.
41. The 3D scanning system of any of the preceding items 39-40, wherein the total number of pattern features is at least 3000, preferably at least 5000, more preferably at least 10000, even more preferably at least 15000, most preferably at least 19000.
42. The 3D scanning system of any of the preceding items 39-41, wherein the similar pattern features are selected from the group of: checkers, triangles, hexagons, dots, lines and striped lines.
43. The 3D scanning system of any of the preceding items, wherein each of said camera optical axes defines an angle of at least 4, 5, 6, 7, preferably at least 8 degrees, more preferably at least 9 degrees, most preferably at least 10 degrees with the projector optical axis.
44. The 3D scanning system of any of the preceding items, wherein the light pattern is non-coded such that no parts of the pattern is unique.
45. The 3D scanning system of any of the preceding items, wherein at least 50%, more preferably at least 75%, most preferably at least 90% or even 100% of the light pattern is a checkerboard pattern.
46. The 3D scanning system of any of the preceding items, wherein each of the cameras is configured to capture a plurality of images that depict at least a portion of the projected pattern of light on the dental object.
47. The 3D scanning system of any of the preceding items, wherein the processor is configured to determine intersections between neighbouring features of the projected pattern, and wherein these intersections are associated with three-dimensional points in space.
48. The 3D scanning system of any of the preceding items, wherein the processor is configured to identify three-dimensional locations of the projected pattern of light based on agreements of the cameras on there being the projected pattern of light by projector rays at certain intersections.
49. The 3D scanning system of the preceding items, wherein the scanning device is a handheld intraoral scanning device.
50. The 3D scanning system of the preceding items, wherein the scanning device is configured to wirelessly transfer data and/or images to an external device.
51. The 3D scanning system of the preceding items, wherein the scanning device comprises an elongated probe having a tip.
52. The 3D scanning system of item 51, wherein the projector unit(s) and cameras are located in a distal end of the elongated probe.
53. A computer-implemented method for generating a digital representation of a three-dimensional (3D) object, the method comprising the steps of:
    - acquiring and/or receiving one or more sets of images, wherein a set of image comprises two or more images of the 3D object, wherein each image comprises a plurality of image features;
    - determining one or more image features in each of the images;
    - determining one or more possible depth(s) associated with each image feature;
    - generating image feature groups, wherein each image feature group comprises one or more image features;
    - generating one or more seed proposals, wherein each seed proposal comprises at least a predefined number of image feature groups, wherein the generation of each seed proposal comprises the steps of:
        - adding one or more image feature groups to a seed proposal based on one or more predefined first criteria;
        - accepting seed proposal(s) comprising at least the predefined number of image feature groups; and
    - generating a digital representation of the 3D object by adding seed proposal(s) to the digital representation based on one or more predefined second criteria.
43. The method according to item 48, wherein the image features are determined using a neural network.
44. The method according to any of the preceding items, wherein the one or more possible depth(s) are determined using a triangulation method.
45. The method according to any of the preceding items, wherein the images are provided by a scanning device comprising a projector unit and two or more cameras.
46. The method according to any of the preceding items, wherein the images are provided by a scanning device comprising a projector unit and four or more cameras.
47. The method according to any of the items 44-46, wherein at least a first number of image(s) are obtained using a first camera and at least a second number of image(s) are obtained using a second camera.
48. The method according to any of the preceding items, wherein each image feature is associated with a set of image coordinates and a camera index indicating which camera acquired the image associated with the image feature.
49. The method according to item 48, wherein the step of determining image features includes determining the image coordinates and a camera index of each image feature.
50. The method according to any of the preceding items, wherein the method further comprises the step of assessing whether one or more of the determined image features should be rejected or not.
51. The method according to any of the preceding items, wherein image features within an image feature group each has a unique camera index.
52. The method according to any of the preceding items, wherein the method further comprises the step of associating zero or more image features, such as one or more image features, to each pattern feature.
53. The method according to any of the preceding items, wherein the method further comprises the step of ordering the determined image features associated with a given pattern feature according to depth prior to the generation of image feature groups.
54. The method according to any of the preceding items, wherein the image feature groups are generated using a sliding window approach, wherein a sliding window of a predetermined size is used to group image features having approximately the same depth.
55. The method according to item 54, wherein the number of cameras is denoted N, and wherein the image feature groups are generated using an iterative process wherein the size of the sliding window is changed iteratively from an initial size of N to a final size smaller than N.

56. The method according to any of the preceding items, wherein the generation of image feature groups comprises the step of assigning a depth to each image feature group.
57. The method according to item 56, wherein the assigned depth is an average of the depths of the image features within the image feature group.
58. The method according to any of the preceding items, wherein a reliability score is assigned to each image feature group, wherein the reliability score indicates how reliable the image feature group is considered.
59. The method according to item 58, wherein the reliability score indicates how close the projector ray associated with the image feature group and the camera rays associated with the image features within said group pass to each other.
60. The method according to any of the preceding items, wherein the standard deviation of the depths of the image features within each image feature group is calculated and assigned to each image feature group.
61. The method according to any of the items 54-59, wherein the standard deviation and/or the size of the sliding window is used to determine the reliability score of each image feature group.
62. The method according to any of the items 54-61, wherein image feature groups are stored in a list, which is sorted according to the standard deviation or the reliability score.
63. The method according to any of the items 54-61, wherein image feature groups having a reliability score above a predefined threshold are determined.
64. The method according to item 63, wherein the method further comprises the step of calibrating the scanning device by adjusting one or more parameters of a mathematical geometry model associated with the scanning device, wherein the adjustment is based on the determined image feature groups.
65. The method according to any of the preceding items, wherein the predefined number of image feature groups in a seed proposal is 5, such that each seed proposal comprises at least 5 image feature groups.
66. The method according to any of the preceding items, wherein the predefined number of image feature groups in a seed proposal is 10, such that each seed proposal comprises at least 10 image feature groups.
67. The method according to any of the preceding items, wherein the predefined number of image feature groups in a seed proposal is 15, such that each seed proposal comprises at least 15 image feature groups.
68. The method according to any of the preceding items, wherein the predefined number of image feature groups in a seed proposal is 20, such that each seed proposal comprises at least 20 image feature groups.
69. The method according to any of the items 58-67, wherein image feature groups are added to the seed proposal(s) in prioritized order according to their reliability score provided the one or more predefined first criteria are met.
70. The method according to any of the items 58-68, wherein the method further comprises the step of adding one or more image feature groups to a queue prior to adding them to a seed proposal.
71. The method according to item 70, wherein the queue is a priority queue, wherein the reliability score is the priority.
72. The method according to any of the items 70-71, wherein image feature groups are removed from the queue one by one according to the priority/reliability score.
73. The method according to any of the items 70-72, wherein each time an image feature group is removed from the queue, the neighboring image feature groups belonging to the most recently removed group, are evaluated according to one or more predefined criteria.
74. The method according to any of the items 70-73, wherein any one or more of the neighboring image feature groups that meet the predefined criteria are added to the queue.
75. The method according to any of the items 70-74, wherein each time an image feature group is removed from the queue, it is added to a seed proposal.
76. The method according to any of the items 59-68, wherein the one or more predefined first criteria comprise a criterium that the standard deviation of a given image feature group has to be below a predefined threshold in order for the image feature group to be added to a seed proposal.
77. The method according to any of the preceding items, wherein the step of generating seed proposal(s) is repeated iteratively, wherein the predefined criteria are changed at each iteration.
78. The method according to item 77, wherein previously generated seed proposals are allowed to grow in one or more subsequent iterations, wherein said iteration(s) are performed under a different set of criteria than the initial set of criteria.
79. The method according to item 78, wherein the different set of criteria are more relaxed than the initial set of criteria.
80. The method according to any of the preceding items, wherein previously generated seed proposals may be allowed to merge with each other and/or new seed proposal(s) may be allowed to merge with previously generated seed proposal(s).
81. The method according to any of the preceding items, wherein the seed proposal(s) are added (to the digital representation) in prioritized order according to the number of image feature groups in each seed proposal.
82. The method according to any of the preceding items, wherein the method further comprises the step of marking image features of seed proposal(s), which have been added to the digital representation.
83. The method according to any of the preceding items, wherein the one or more predefined second criteria comprise a criterium that the seed proposal should comprise at least a predefined amount of image features, which are not marked, in order for the seed proposal to be added to the digital representation.
84. The method according to any of the preceding items, wherein the method further comprises the step of projecting a predefined pattern onto the 3D object, wherein the pattern comprises a plurality of pattern features, wherein the pattern is projected by one or more projector units each having a projector plane.
85. The method according to any of the preceding items, wherein the method further comprises the step of acquiring two or more images of the 3D object, wherein the images are acquired by two or more cameras.
86. The method according to item 84, wherein each pattern feature is associated with a predefined property.

87. The method according to any of the items 84-86, wherein the predefined pattern comprises any of stripes, squares, dots, triangles, rectangles, and/or combinations thereof.
88. The method according to any of the preceding items, wherein the image features are selected from the group of corners, edges, vertices, points, transitions, dots, stripes, and/or combinations thereof.
89. The method according to any of the items 84-88, wherein the image features are selected from the group of corners, edges, vertices, points, transitions, dots, stripes, and/or combinations thereof.
90. The method according to any of the items 84-89, wherein the predefined pattern is a checkerboard pattern comprising a plurality of checkers.
91. The method according to any of the items 84-90, wherein the image features are corners in the checkerboard pattern.
92. The method according to any of the items 88-91, wherein the pattern features are corners in the checkerboard pattern.
93. The method according to any of the preceding items, wherein each image feature is associated with a predefined property.
94. The method according to any of the preceding items, wherein the predefined property of the image/pattern features is a phase of the pattern, wherein the phase can be either white-black or black-white.
95. The method according to any of the preceding items, wherein each camera has a pre-defined field of view, wherein the cameras are configured such that their field of view at least partially overlap.
96. The method according to any of the preceding items, wherein the field of view of each camera is between 50-115 degrees, such as 65-100 degrees, or 80-90 degrees.
97. The method according to any of the items 84-95, wherein each of the cameras has a predefined fixed position relative to the one or more projector units.
98. The method according to any of the preceding items, wherein the step of determining the image features comprises generating a neighborhood graph for each image, wherein each neighborhood graph stores the image feature position of each of the determined image features.
99. The method according to item 98, wherein each neighborhood graph further stores information related to the connectivity of the image features, i.e., which image features are the neighbors of a given image feature.
100. The method according to any of the items 98-99, wherein each neighborhood graph further stores a predefined property, such as the phase, of each of the image features.
101. The method according to any of the items 98-100, wherein the neighborhood graph(s) are generated using a neural network.
102. The method according to item 101, wherein the projected pattern is a checkerboard pattern, and wherein the neural network is trained to determine the corners in the checkerboard in the acquired images.
103. The method according to any of the items 101-102, wherein the neural network is trained to classify the checkers of the checkerboard into black and white checkers.
104. The method according to any of items 84-103, wherein the method further comprises the step of associating, for each pattern feature, a number of image features, such as zero or more image features, among the determined image features.
105. The method according to item 104, wherein the association of image features to pattern features comprises the steps of:
projecting, for each image, each of the image features onto the projector plane whereby an epipolar line is obtained for each projected image feature; and
associating, for each pattern feature, any image features whose corresponding epipolar line passes within a predefined distance to a pattern feature.
106. The method according to any of items 84-104, wherein the step of determining the depth(s) associated with each image feature comprises the steps of:
projecting, for each camera, a camera ray for each of the image features in the acquired images, wherein each camera ray is projected in 3D;
projecting a projector ray for each pattern feature, wherein each projector ray is projected in 3D;
determining points in 3D, wherein the camera rays associated with image features of different camera index intersect the projector ray within a predefined distance, wherein each of the determined points corresponds to a depth; and
assigning the depth(s) to each image feature.
107. A processor or computer system comprising means for carrying out the method according to any of the items 48-106.
108. A computer program comprising instructions which, when the program is executed by a processor, cause the processor to carry out the method according to any of the items 48-106.
109. A computer-readable medium having stored thereon the computer program of item 108.
110. A method of generating a digital representation of a three-dimensional (3D) object, the method comprising the steps of:
projecting a predefined pattern onto the 3D object, wherein the pattern comprises a plurality of pattern features each associated with a predefined property, wherein the pattern is projected by one or more projector units each having a projector plane;
acquiring two or more images of the 3D object, wherein the images are acquired by a scanning device comprising two or more cameras, wherein each image comprises a plurality of image features, wherein each image feature is associated with a set of image coordinates and a camera index indicating which camera acquired the image associated with the image feature, and wherein each image feature is associated with a predefined property;
determining the image features in each of the images, wherein the determination includes determining the image coordinates and a camera index of each image feature;
determining one or more depths associated with each image feature using a triangulation method;
generating image feature groups, wherein each image feature group comprises one or more image features each having a unique camera index, wherein a depth is assigned to each image feature group;
generating one or more seed proposals, wherein each seed proposal comprises at least a predefined number of image feature groups, wherein the generation of each seed proposal comprises the steps of:

adding one or more image feature groups to a seed proposal based on one or more predefined first criteria; and accepting seed proposal(s) comprising at least the predefined number of image feature groups; and generating a digital representation of the 3D object by adding seed proposal(s) to the digital representation based on one or more predefined second criteria.

111. The method according to item 110, wherein each camera has a pre-defined field of view, wherein the cameras are configured such that their field of view at least partially overlap, wherein each of the cameras has a predefined fixed position relative to the one or more projector units.

112. A dental scanning system for generating a digital representation of a three-dimensional (3D) object, the scanning system comprising:

a scanning device comprising:

one or more projector units configured for projecting a predefined pattern onto the 3D object, wherein the pattern comprises a plurality of pattern features, wherein each projector unit is associated with a projector plane;

two or more cameras for each projector unit, wherein each camera is configured for acquiring images of at least a part of the object, wherein each of the cameras has a predefined fixed position relative to the one or more projector units; and one or more processors configured for carrying out the method according to any of the items 48-106.

113. The dental scanning system according to item 112, wherein the predefined pattern is a static pattern.

114. The dental scanning system according to any of the items 112-113, wherein the scanning device comprises at least four cameras for each projector unit.

115. The dental scanning system according to any of the items 112-114, wherein the one or more processors are located on the scanning device.

116. The dental scanning system according to any of the items 112-115, wherein the one or more processors comprise a field-programmable gate array and/or a central processing unit (CPU).

117. A dental scanning system for generating a digital representation of a three-dimensional (3D) object, the scanning system comprising:

a scanning device comprising:

one or more projector units configured for projecting a predefined static pattern onto the 3D object, wherein the pattern comprises a plurality of pattern features, wherein each projector unit is associated with a projector plane;

two or more cameras for each projector unit, wherein each camera is configured for acquiring images of at least a part of the object, wherein each of the cameras has a predefined fixed position relative to the one or more projector units, wherein the scanning device is configured for acquiring two or more images of the 3D object; and a first processor configured to perform the step of:

determining the image features in each of the images;

a second processor configured to perform the steps of:

determining one or more depth(s) associated with each image feature using a triangulation method;

generating image feature groups, wherein each image feature group comprises one or more image features;

generating one or more seed proposals, wherein each seed proposal comprises at least a predefined number of image feature groups, wherein the generation of each seed proposal comprises the steps of:

i. adding one or more image feature groups to a seed proposal based on one or more predefined first criteria;

ii. accepting seed proposal(s) comprising at least the predefined number of image feature groups; and generating a digital representation of the 3D object by adding seed proposal(s) to the digital representation based on one or more predefined second criteria.

118. A 3D scanning system comprising:

an intraoral scanning device for scanning a dental object, the scanning device comprising:

one or more projector units configured to project a pattern on a surface of a dental object, wherein the pattern comprises a predefined number of fiducial markers;

two or more cameras for each projector unit, wherein the cameras are configured to acquire one or more sets of images, wherein each set of images comprises at least one image from each camera, wherein each image includes at least a portion of the projected pattern, said portion including at least one of said fiducial markers;

one or more processors configured to:

identify one or more fiducial markers within at least one set of images among the acquired sets of images;

solve a correspondence problem related to the identified fiducial markers, wherein the correspondence problem is solved such that points in 3D space are determined based on the identified fiducial markers, wherein said points form a solution to the correspondence problem; and calibrate the scanning device by adjusting one or more parameters of a mathematical geometry model associated with the scanning device, wherein the adjustment is based on the solution to the correspondence problem.

119. The 3D scanning system according to item 118, wherein the one or more parameters of the mathematical geometry model are selected from the group of: position of the camera(s), orientation of the camera(s), intrinsic parameters of the camera(s).

120. The 3D scanning system according to any of the items 118-119, wherein the intrinsic parameters of the camera(s) are selected from the group of: focal length of the camera(s), offset of a lens in the camera(s), distortion of one or more lenses inside the scanning device, and/or combinations thereof.

121. The 3D scanning system according to any of the items 118-120, wherein the one or more processors are configured to perform the calibration in real-time during scanning of the dental object.

122. The 3D scanning system according to any of the items 118-121, wherein the processor(s) are further configured to mathematically project one or more camera rays and projector rays together in 3D space, said rays associated with the fiducial markers; and minimizing the distance between the camera rays and a given associated projector ray by dynamically adjusting one or more parameters of the mathematical geometry model.

123. The 3D scanning system according to any of the items 118-122, wherein the scanning device is configured to wirelessly transfer data and/or images to an external device.

124. A method for calibrating an intraoral scanning device, the method comprising the steps of:

projecting a pattern on a surface of a dental object using an intraoral scanning device, wherein the pattern comprises a predefined number of fiducial markers;

acquiring one or more sets of images, wherein each set of images comprises at least two images, wherein each image includes at least a portion of the projected pattern, said portion including at least one of said fiducial markers;

identifying one or more fiducial marker(s) within a first set of acquired images;

solving a correspondence problem related to the fiducial markers, wherein the correspondence problem is solved such that points in 3D space are determined based on the identified fiducial markers, wherein said points form a solution to the correspondence problem; and calibrating the scanning device by adjusting one or more parameters of a mathematical geometry model associated with the scanning device, wherein the adjustment is based on the solution to the correspondence problem.

125. The method according to item 124, wherein the correspondence problem is solved using a triangulation method.

126. The method according to any of the items 124-125, wherein the one or more parameters of the mathematical geometry model are selected from the group of: position of the camera(s) of the scanning device, orientation of the camera(s) of the scanning device, focal length of the camera(s), offset of a lens in the camera (s), distortion of one or more lenses inside the scanning device, and/or combinations thereof.

127. The method according to any of the items 124-126, wherein the calibration is performed in real-time during scanning of the dental object.

128. The method according to any of the items 124-127, wherein the method further comprises the steps of:

determining one or more image features within each set of images;

solving a second correspondence problem within each set of images using a triangulation method, such that points in 3D space are determined based on the image features, wherein said points form a solution to the second correspondence problem, wherein the second correspondence problem is solved for groups of image features; and generating a digital three-dimensional representation of the dental object, wherein the solution to the second correspondence problem is used to generate the three-dimensional representation.

129. A method for calibrating an intraoral scanning device, the method comprising the steps of:

projecting a pattern on a surface of a dental object using an intraoral scanning device, wherein the pattern comprises a predefined number of fiducial markers;

acquiring one or more sets of images, wherein each set of images comprises at least two images, wherein each image includes at least a portion of the projected pattern, said portion including at least one of said fiducial markers;

identifying one or more image features within a first set of acquired images;

solving a correspondence problem related to the image features, wherein the correspondence problem is solved such that points in 3D space are determined based on the identified image features, wherein said points form a solution to the correspondence problem; and calibrating the scanning device by adjusting one or more parameters of a mathematical geometry model associated with the scanning device, wherein the adjustment is based on the solution to the correspondence problem.

Although some embodiments have been described and shown in detail, the disclosure is not restricted to such details, but may also be embodied in other ways within the scope of the subject matter defined in the following claims. In particular, it is to be understood that other embodiments may be utilized, and structural and functional modifications may be made without departing from the scope of the present disclosure. Furthermore, the skilled person would find it apparent that unless an embodiment is specifically presented only as an alternative, different disclosed embodiments may be combined to achieve a specific implementation and such specific implementation is within the scope of the disclosure.

A claim may refer to any of the preceding claims, and "any" is understood to mean "any one or more" of the preceding claims.

It should be emphasized that the term "comprises/comprising/including" when used in this specification is taken to specify the presence of stated features, integers, operations, steps or components but does not preclude the presence or addition of one or more other features, integers, steps, components or groups thereof.

The invention claimed is:

1. A 3D scanning system for scanning a dental object, comprising:

an intraoral 3D scanning device comprising:

a first projector unit configured to project a first light pattern on the dental object along a projector optical axis, wherein the first light pattern comprises a first type of pattern features in a first hexagonal or triangular lattice;

a second projector unit configured to project a second light pattern on the dental object, wherein the second light pattern comprises a second type of pattern features in a second hexagonal or triangular lattice; and one or more cameras, each of the cameras comprising an image sensor for acquiring one or more images; and one or more processors configured to;

identify one or more image features in the one or more images using a neural network, wherein the image features correspond to pattern features of the first and second light patterns;

determine one or more depths associated with each of the identified image features based on triangulation; and generate a digital three-dimensional representation of the dental object based on the determined depths.

2. The 3D scanning system according to claim 1, wherein the numerical aperture of the first and/or second projector units is between 0.0035 and 0.015.

3. The 3D scanning system according to claim 1, wherein the first and/or second projector units comprise an aperture having a predetermined size such that it provides a pupil diameter of between 0.2 mm to 0.7 mm.

4. The 3D scanning system according to claim 1, wherein the working distance of the first and second projector units and a given camera is between 15 mm and 50 mm.

5. The 3D scanning system according to claim 1, wherein the first and/or second projector units are configured for sequentially turning the light source on and off at a predetermined frequency, wherein the light source is on for a predetermined time period.

6. The 3D scanning system according to claim 5, wherein the time period is between 4 milliseconds (ms) and 8 milliseconds (ms), and wherein the frequency is between 25 Hz and 35 Hz.

7. The 3D scanning system according to claim 1, wherein the image sensor(s) is/are a rolling shutter image sensor.

8. The 3D scanning system according to claim 1, wherein the first and/or second patterns comprise a predefined number of fiducial markers.

9. The 3D scanning system according to claim 1, wherein the cameras are configured to acquire one or more sets of images, wherein each set of images comprises at least one image from each camera, wherein each image includes at least a portion of the first and second projected patterns.

10. The 3D scanning system according to claim 9, wherein the images in a given set of images are acquired simultaneously, wherein each camera contribute with one image to the set of images.

11. The 3D scanning system according to claim 8, wherein said portion includes at least one of said fiducial markers.

12. The 3D scanning system according to claim 11, wherein the first and/or second patterns comprise at least one fiducial marker for every 100 pattern features.

13. The 3D scanning system according to claim 8, wherein the one or more processors comprise a first processor configured to identify the fiducial markers in the projected pattern, wherein the first processor is configured to identify the fiducial markers using a neural network.

14. The 3D scanning system according to claim 13, wherein the first processor is a neural processing unit (NPU).

15. The 3D scanning system according to claim 8, wherein the one or more processors are further configured to:
- identify one or more fiducial markers within at least one set of images among the acquired sets of images;
- solve a correspondence problem related to the identified fiducial markers, wherein the correspondence problem is solved such that points in 3D space are determined based on the identified fiducial markers, wherein said points form a solution to the correspondence problem; and
- calibrate the scanning device by adjusting one or more parameters of a mathematical geometry model associated with the scanning device, wherein the adjustment is based on the solution to the correspondence problem.

16. The 3D scanning system according to claim 15, wherein the one or more parameters of the mathematical geometry model are selected from the group of: position of the camera(s), orientation of the camera(s), intrinsic parameters of the camera(s), and/or combinations thereof.

17. The 3D scanning system according to claim 15, wherein the one or more processors are configured to perform the calibration in real-time during scanning of the dental object.

18. The 3D scanning system according to claim 15, wherein the step of calibrating the scanning device comprises the steps of:
- mathematically projecting one or more camera rays and projector rays together in 3D space, said rays associated with the fiducial markers; and
- minimizing the distance between the camera rays and a given associated projector ray by dynamically adjusting one or more parameters of the mathematical geometry model.

19. The 3D scanning system according to claim 1, wherein the first and/or second types of pattern features comprise dots.

20. The 3D scanning system according to claim 1, wherein the first and second types of pattern features are different colors.

21. The 3D scanning system according to claim 1, wherein the first projector unit comprises a blue laser diode, and wherein the second projector unit comprises a green laser diode.

22. A 3D scanning system for scanning a dental object, comprising:
- an intraoral 3D scanning device comprising:
  - a projector unit configured to project a light pattern on the dental object, wherein the light pattern comprises a first type of pattern features in a first hexagonal or triangular lattice and a second type of pattern features in a second hexagonal or triangular lattice; and
  - one or more cameras, each of the cameras comprising an image sensor for acquiring one or more images of the dental object illuminated by the light pattern; and
- one or more processors configured to;
  - identify one or more image features in the one or more images using a neural network, wherein the image features correspond to the first and second types of pattern features of the light pattern;
  - determine one or more depths associated with each of the identified image features based on triangulation; and
  - generate a digital three-dimensional representation of the dental object based on the determined depths.

23. The 3D scanning system according to claim 22, wherein the first and/or second types of pattern features may comprise dots.

24. The 3D scanning system according to claim 22, wherein the first and second types of pattern features are different colors.

25. The 3D scanning system according to claim 22, wherein the projector unit comprises a blue laser diode and a green laser diode.

26. A 3D scanning system for scanning a dental object, comprising:
- an intraoral 3D scanning device comprising:
  - a first projector unit configured to project a first light pattern on the dental object along a projector optical axis, wherein the first light pattern comprises a first type of pattern features in a first hexagonal or triangular lattice;
  - a second projector unit configured to project a second light pattern on the dental object, wherein the second light pattern comprises a second type of pattern features in a second hexagonal or triangular lattice; and one or more cameras, each of the cameras comprising an image sensor for acquiring one or more images; and one or more processors configured to:

determine one or more image features in each of one or more sets of images acquired by the one or more cameras, wherein each set of images comprises at least two images and wherein the image features correspond to pattern features of the first and second light patterns;

generate image feature groups, wherein each image feature group comprises multiple image features;

determine a correspondence between image features and pattern features by solving a correspondence problem for each image feature group;

determine one or more depths by triangulating based on the determined correspondence between image features and pattern features; and generate a digital three-dimensional representation of the dental object based on the determined depths.

* * * * *